United States Patent
Yang et al.

(10) Patent No.: US 12,184,422 B2
(45) Date of Patent: Dec. 31, 2024

(54) POWER CONTROL FOR HYBRID AUTOMATIC REPEAT REQUEST

(71) Applicant: QUALCOMM Incorporated, San Diego, CA (US)

(72) Inventors: Wei Yang, San Diego, CA (US); Konstantinos Dimou, New York, NY (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 18/157,907

(22) Filed: Jan. 23, 2023

(65) Prior Publication Data

US 2023/0275702 A1 Aug. 31, 2023

Related U.S. Application Data

(60) Provisional application No. 63/268,667, filed on Feb. 28, 2022.

(51) Int. Cl.
*H04L 1/1812* (2023.01)
*H04L 5/00* (2006.01)
*H04W 72/21* (2023.01)

(52) U.S. Cl.
CPC .......... *H04L 1/1812* (2013.01); *H04L 5/0055* (2013.01); *H04W 72/21* (2023.01)

(58) Field of Classification Search
CPC ..... H04L 1/1812; H04L 5/0055; H04W 72/21
See application file for complete search history.

(56) References Cited

U.S. PATENT DOCUMENTS

| 2013/0329688 A1 | 12/2013 | Yang et al. | |
| 2015/0009910 A1* | 1/2015 | Ryu | H04W 72/04 370/329 |
| 2019/0124558 A1* | 4/2019 | Ang | H04W 72/23 |

(Continued)

FOREIGN PATENT DOCUMENTS

WO   WO-2020197195 A1 * 10/2020  ........... H04L 1/1607

OTHER PUBLICATIONS

Huawei., et al., "UE Feedback Enhancements for HARQ-ACK", 3GPP TSG RAN WG1 Meeting #106bis-e, R1-2108726, 3rd Generation Partnership Project, Mobile Competence Centre, 650, Route Des Lucioles, F-06921 Sophia-Antipolis Cedex, France, vol. RAN WG1, No. e-Meeting, Aug. 11, 2021-Aug. 19, 2021, Oct. 2, 2021, 19 Pages, XP052057823, Section 2.3.3, pp. 15, 16.

(Continued)

*Primary Examiner* — Samir W Rizk
(74) *Attorney, Agent, or Firm* — Harrity & Harrity, LLP

(57) ABSTRACT

Various aspects of the present disclosure generally relate to wireless communication. In some aspects, a user equipment (UE) may obtain one or more of a number of actual bits or a number of dummy bits associated with a hybrid automatic repeat request acknowledgement (HARQ-ACK) transmission that includes one or more of a deferred semi-persistent scheduling (SPS) HARQ-ACK or a retransmitted HARQ-ACK codebook. The UE may transmit the HARQ-ACK using a power for a physical uplink control channel (PUCCH) that is based at least in part on the number of actual bits, the number of dummy bits, or a total number of bits that is a sum of the number of actual bits and the number of dummy bits. Numerous other aspects are described.

35 Claims, 10 Drawing Sheets

(56) References Cited

U.S. PATENT DOCUMENTS

2020/0228251 A1* 7/2020 Yeo .................. H04L 1/1822
2021/0050961 A1* 2/2021 Chen Larsson ....... H04L 1/1861
2021/0274503 A1* 9/2021 Farag .................. H04W 76/11

OTHER PUBLICATIONS

Intel Corporation: "Remaining Open Issues of UE HARQ Feedback Enhancements", R1-2111489, 3GPP TSG RAN WG1 #107-e, 3rd Generation Partnership Project, Mobile Competence Centre, 650, Route Des Lucioles, F-06921 Sophia-Antipolis Cedex, France, vol. RAN WG1, No. e-Meeting, Nov. 11-19, 2021, Nov. 6, 2021, XP052074904, 10 Pages, pp. 3-5.
International Search Report and Written Opinion—PCT/US2023/061154—ISA/EPO—May 15, 2023.

* cited by examiner

POWER CONTROL FOR HYBRID AUTOMATIC REPEAT REQUEST

CROSS-REFERENCE TO RELATED APPLICATION

This patent Application claims priority to U.S. Provisional Patent Application No. 63/268,667, filed on Feb. 28, 2022, entitled "POWER CONTROL FOR HYBRID AUTOMATIC REPEAT REQUEST," and assigned to the assignee hereof. The disclosure of the prior Application is considered part of and is incorporated by reference into this patent Application.

FIELD OF THE DISCLOSURE

Aspects of the present disclosure generally relate to wireless communication and to techniques and apparatuses for power control for hybrid automatic repeat request.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

A hybrid automatic repeat request acknowledgement (HARQ-ACK) transmission may include a deferred semi-persistent scheduling (SPS) HARQ-ACK or a retransmitted HARQ-ACK codebook. In this case, a user equipment (UE) transmitting the HARQ-ACK may not be able to accurately determine the number of bits for calculating a transmit power. For example, the UE may not be able to distinguish between dummy bits, such as bits that are known to a network node prior to receiving the HARQ-ACK, and actual bits, such as bits that are not known to the network node prior to receiving the HARQ-ACK. Thus, the UE may transmit the HARQ-ACK with a higher transmit power than is needed. This may cause interference with other UEs in the network and/or may result in wasted power resources of the UE.

Techniques and apparatuses are described herein for transmit power control for HARQ-ACK transmission. In some aspects, a UE may obtain a number of actual bits and/or a number of dummy bits associated with a HARQ-ACK transmission that includes a deferred SPS HARQ-ACK or a retransmitted HARQ-ACK codebook. The UE may transmit the HARQ-ACK using a power for a physical uplink control channel (PUCCH) that is based at least in part on the number of actual bits, the number of dummy bits, or a total number of bits that is a sum of the number of actual bits and the number of dummy bits. This may decrease the power of the HARQ-ACK transmission, thereby reducing the likelihood of interference with other UEs and reducing the number of UE power resources that are needed.

Some aspects described herein relate to a method of wireless communication performed by UE. The method may include obtaining one or more of a number of actual bits or a number of dummy bits associated with a HARQ-ACK transmission that includes one or more of a deferred SPS HARQ-ACK or a retransmitted HARQ-ACK codebook. The method may include transmitting the HARQ-ACK using a power for a PUCCH that is based at least in part on the number of actual bits, the number of dummy bits, or a total number of bits that is a sum of the number of actual bits and the number of dummy bits.

Some aspects described herein relate to an apparatus for wireless communication performed by a UE. The apparatus may include a memory and one or more processors, coupled to the memory. The one or more processors may be configured to obtain one or more of a number of actual bits or a number of dummy bits associated with a HARQ-ACK transmission that includes one or more of a deferred SPS HARQ-ACK or a retransmitted HARQ-ACK codebook. The one or more processors may be configured to transmit the HARQ-ACK using a power for a PUCCH that is based at least in part on the number of actual bits, the number of dummy bits, or a total number of bits that is a sum of the number of actual bits and the number of dummy bits.

Some aspects described herein relate to a non-transitory computer-readable medium that stores a set of instructions for wireless communication by a UE. The set of instructions, when executed by one or more processors of the UE, may cause the UE to obtain one or more of a number of actual bits or a number of dummy bits associated with a HARQ-ACK transmission that includes one or more of a deferred SPS HARQ-ACK or a retransmitted HARQ-ACK codebook. The set of instructions, when executed by one or more processors of the UE, may cause the UE to transmit the HARQ-ACK using a power for a PUCCH that is based at least in part on the number of actual bits, the number of dummy bits, or a total number of bits that is a sum of the number of actual bits and the number of dummy bits.

Some aspects described herein relate to an apparatus for wireless communication. The apparatus may include means for obtaining one or more of a number of actual bits or a number of dummy bits associated with a hybrid automatic repeat request acknowledgement (HARQ-ACK) transmission that includes one or more of a deferred semi-persistent scheduling (SPS) HARQ-ACK or a retransmitted HARQ-ACK codebook. The apparatus may include means for transmitting the HARQ-ACK using a power for a physical uplink control channel (PUCCH) that is based at least in part on the number of actual bits, the number of dummy bits, or a total number of bits that is a sum of the number of actual bits and the number of dummy bits.

Aspects generally include a method, apparatus, system, computer program product, non-transitory computer-readable medium, user equipment, base station, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
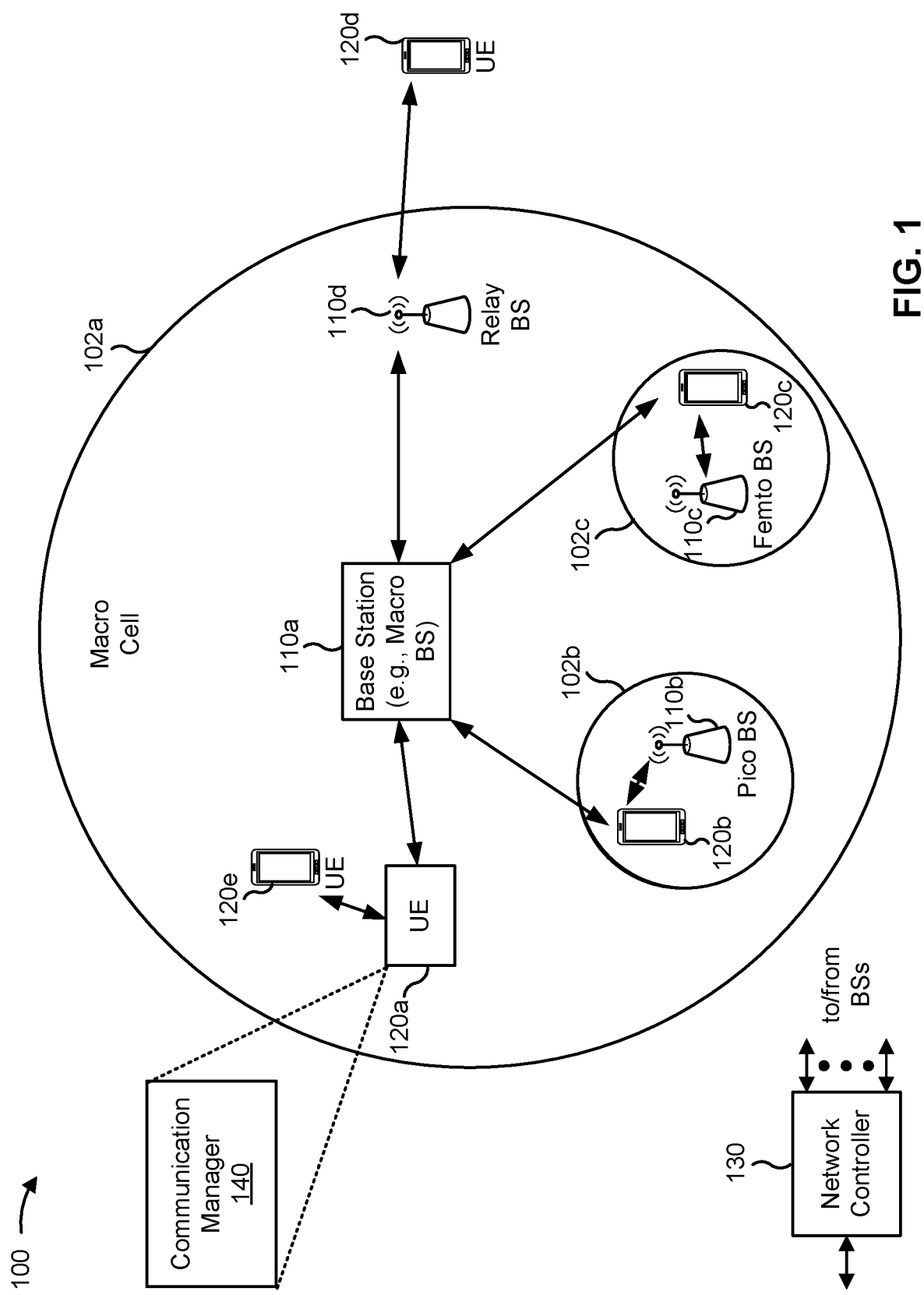
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Moreover, although depicted as an integral unit in FIG. 1, aspects of the disclosure are not so limited. In some other aspects, the functionality of the base station 110 may be disaggregated according to an open radio access network (RAN) (O-RAN) architecture or the like, which is described in more detail in connection with FIG. 3. Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may obtain one or more of a number of actual bits or a number of dummy bits associated with a hybrid automatic repeat request acknowledgement (HARQ-ACK) transmission that includes one or more of a deferred semi-persistent scheduling (SPS) HARQ-ACK or a retransmitted HARQ-ACK codebook; and transmit the HARQ-ACK using a power for a physical uplink control channel (PUCCH) that is based at least in part on the number of actual bits, the number of dummy bits, or a total number of bits that is a sum of the number of actual bits and the number of dummy bits. Additionally, or alternatively, the communication manager 140 may perform one or more other operations described herein.

As indicated above, FIG. 1 is provided as an example. Other examples may differ from what is described with regard to FIG. 1.

Figure 2:
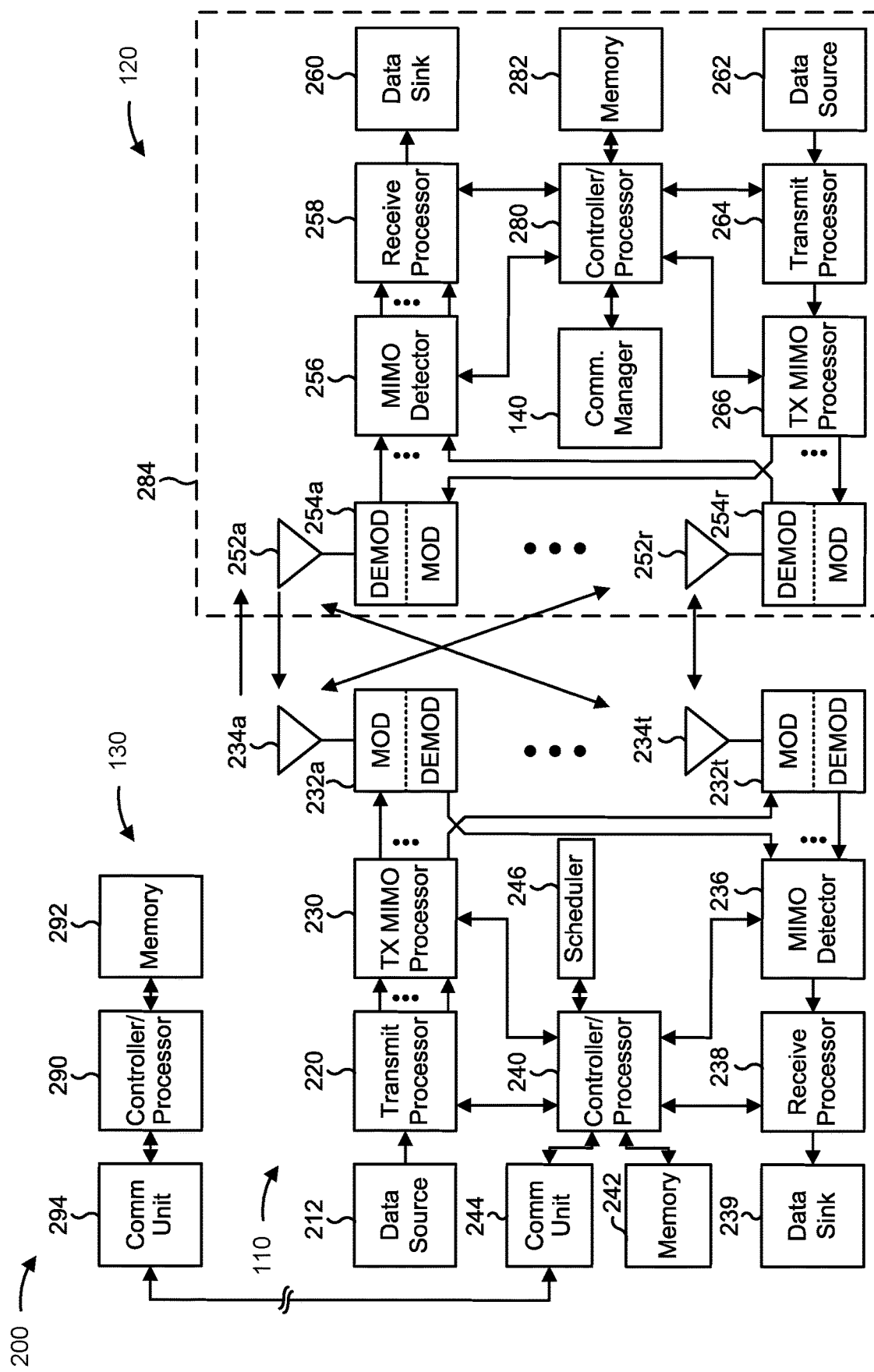
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-9).

The controller/processor 240 of the base station 110, the controller/processor 280 of the UE 120, and/or any other component(s) of FIG. 2 may perform one or more techniques associated with power control for HARQ-ACK transmission, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for obtaining one or more of a number of actual bits or a number of dummy bits associated with a HARQ-ACK transmission that includes one or more of a deferred SPS HARQ-ACK or a retransmitted HARQ-ACK codebook; and/or means for transmitting the HARQ-ACK using a power for a PUCCH that is based at least in part on the number of actual bits, the number of dummy bits, or a total number of bits that is a sum of the number of actual bits and the number of dummy bits. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
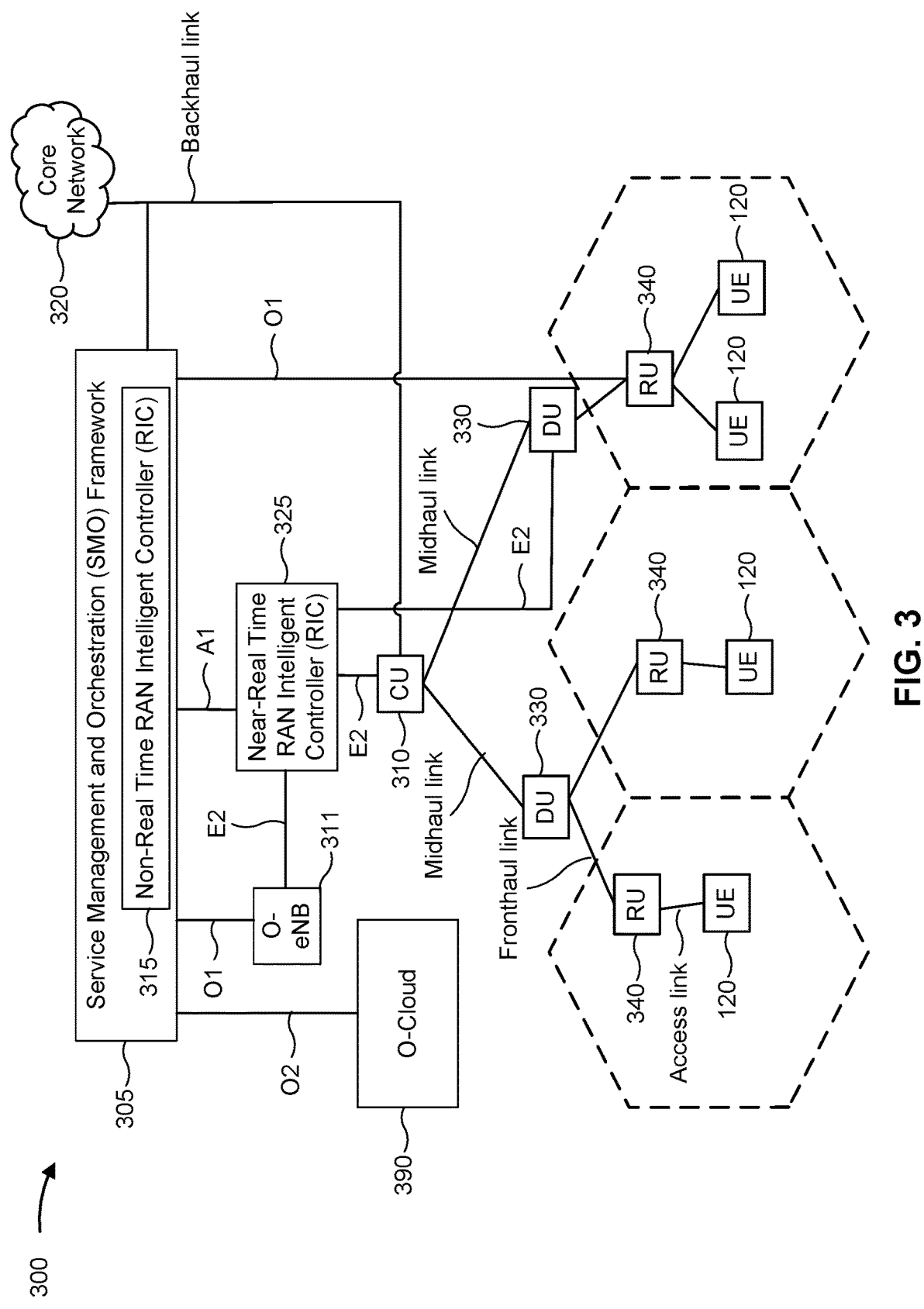
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the non-RT RIC 315 or the Near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
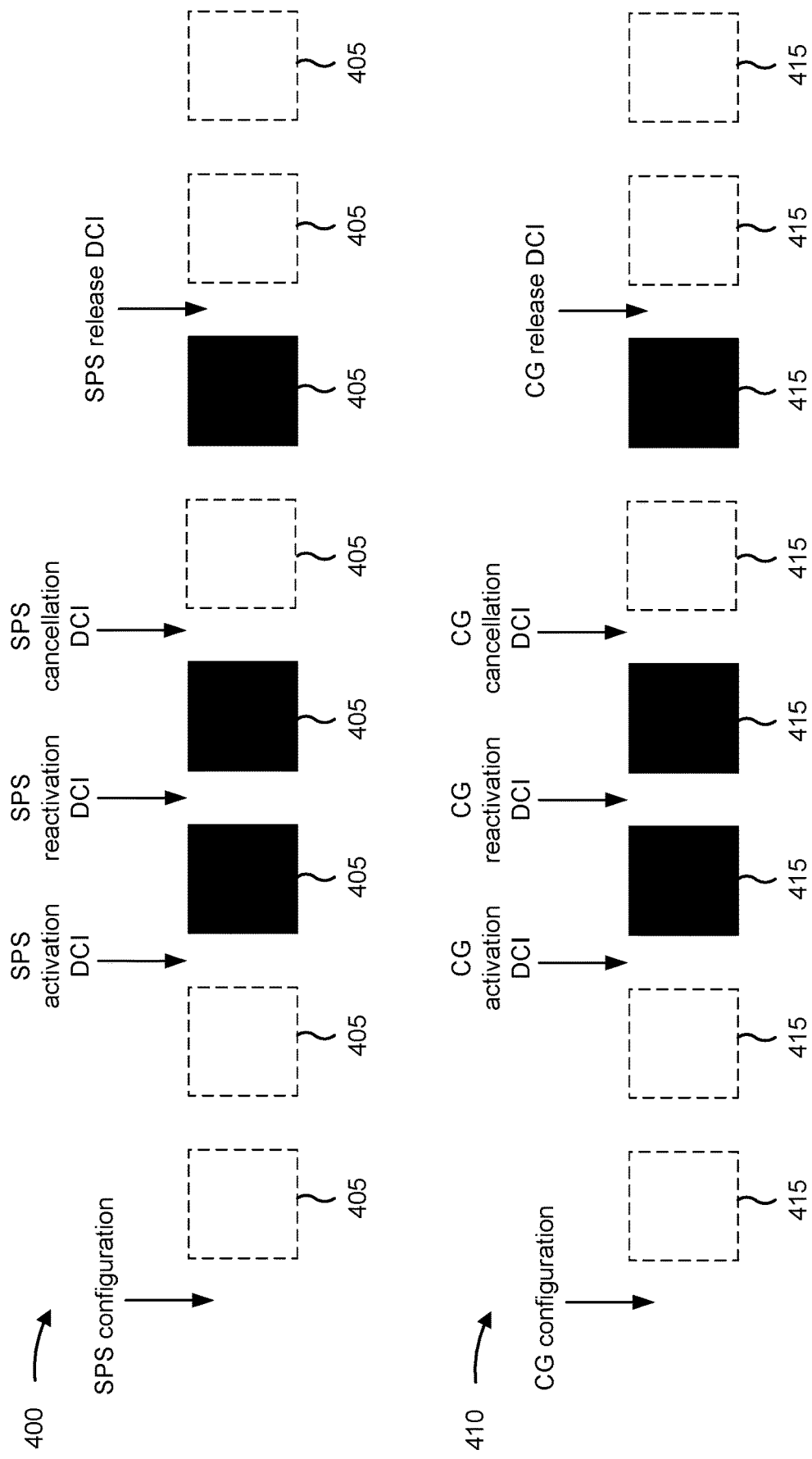
FIG. 4 is a diagram illustrating examples of downlink semi-persistent scheduling communication and uplink configured grant communication, in accordance with the present disclosure.

FIG. 4 is a diagram illustrating an example 400 of downlink semi-persistent scheduling (SPS) communication and an example 410 of uplink configured grant (CG) communication, in accordance with the present disclosure. SPS communications may include periodic downlink communications that are configured for a UE, such that the base station does not need to send separate downlink control information (DCI) to schedule each downlink communication, thereby conserving signaling overhead. CG communications may include periodic uplink communications that are configured for a UE, such that the base station does not need to send separate DCI to schedule each uplink communication, thereby conserving signaling overhead.

As shown in example 400, a UE may be configured with an SPS configuration for SPS communications. For example, the UE may receive the SPS configuration via a radio resource control (RRC) message transmitted by a base station. The SPS configuration may indicate a resource allocation associated with SPS downlink communications (e.g., in a time domain, frequency domain, spatial domain, and/or code domain) and a periodicity at which the resource allocation is repeated, resulting in periodically reoccurring scheduled SPS occasions 405 for the UE. The SPS configuration may also configure hybrid automatic repeat request (HARQ)-acknowledgement (ACK) (HARQ-ACK) feedback resources for the UE to transmit HARQ-ACK feedback for SPS physical downlink shared channel (PDSCH) communications received in the SPS occasions 405. For example, the SPS configuration may indicate a PDSCH-to-HARQ feedback timing value, which may be referred to as a K1 value in a wireless communication standard (e.g., a 3GPP standard).

The base station may transmit SPS activation DCI to the UE to activate the SPS configuration for the UE. The base station may indicate, in the SPS activation DCI, communication parameters, such as an MCS, a resource block (RB) allocation, and/or antenna ports, for the SPS PDSCH communications to be transmitted in the scheduled SPS occasions 405. The UE may begin monitoring the SPS occasions 405 based at least in part on receiving the SPS activation DCI. For example, beginning with a next scheduled SPS occasion 405 subsequent to receiving the SPS activation DCI, the UE may monitor the scheduled SPS occasions 405 to decode PDSCH communications using the communication parameters indicated in the SPS activation DCI. The UE may refrain from monitoring configured SPS occasions 405 prior to receiving the SPS activation DCI.

The base station may transmit SPS reactivation DCI to the UE to change the communication parameters for the SPS PDSCH communications. Based at least in part on receiving the SPS reactivation DCI, the UE may begin monitoring the scheduled SPS occasions 405 using the communication parameters indicated in the SPS reactivation DCI. For example, beginning with a next scheduled SPS occasion 405 subsequent to receiving the SPS reactivation DCI, the UE may monitor the scheduled SPS occasions 405 to decode PDSCH communications based on the communication parameters indicated in the SPS reactivation DCI.

In some cases, such as when the base station does not have downlink traffic to transmit to the UE, the base station may transmit SPS cancellation DCI to the UE to temporarily cancel or deactivate one or more subsequent SPS occasions 405 for the UE. The SPS cancellation DCI may deactivate only a subsequent one SPS occasion 405 or a subsequent N SPS occasions 405 (where N is an integer). SPS occasions 405 after the one or more (e.g., N) SPS occasions 405 subsequent to the SPS cancellation DCI may remain activated. Based at least in part on receiving the SPS cancellation DCI, the UE may refrain from monitoring the one or more (e.g., N) SPS occasions 405 subsequent to receiving the SPS cancellation DCI. As shown in example 400, the SPS cancellation DCI cancels one subsequent SPS occasion

405 for the UE. After the SPS occasion 405 (or N SPS occasions) subsequent to receiving the SPS cancellation DCI, the UE may automatically resume monitoring the scheduled SPS occasions 405.

The base station may transmit SPS release DCI to the UE to deactivate the SPS configuration for the UE. The UE may stop monitoring the scheduled SPS occasions 405 based at least in part on receiving the SPS release DCI. For example, the UE may refrain from monitoring any scheduled SPS occasions 405 until another SPS activation DCI is received from the base station. Whereas the SPS cancellation DCI may deactivate only a subsequent one SPS occasion 405 or a subsequent N SPS occasions 405, the SPS release DCI deactivates all subsequent SPS occasions 405 for a given SPS configuration for the UE until the given SPS configuration is activated again by a new SPS activation DCI.

As shown in example 410, a UE may be configured with a CG configuration for CG communications. For example, the UE may receive the CG configuration via an RRC message transmitted by a base station. The CG configuration may indicate a resource allocation associated with CG uplink communications (e.g., in a time domain, frequency domain, spatial domain, and/or code domain) and a periodicity at which the resource allocation is repeated, resulting in periodically reoccurring scheduled CG occasions 415 for the UE. In some examples, the CG configuration may identify a resource pool or multiple resource pools that are available to the UE for an uplink transmission. The CG configuration may configure contention-free CG communications (e.g., where resources are dedicated for the UE to transmit uplink communications) or contention-based CG communications (e.g., where the UE contends for access to a channel in the configured resource allocation, such as by using a channel access procedure or a channel sensing procedure).

The base station may transmit CG activation DCI to the UE to activate the CG configuration for the UE. The base station may indicate, in the CG activation DCI, communication parameters, such as an MCS, an RB allocation, and/or antenna ports, for the CG physical uplink shared channel (PUSCH) communications to be transmitted in the scheduled CG occasions 415. The UE may begin transmitting in the CG occasions 415 based at least in part on receiving the CG activation DCI. For example, beginning with a next scheduled CG occasion 415 subsequent to receiving the CG activation DCI, the UE may transmit a PUSCH communication in the scheduled CG occasions 415 using the communication parameters indicated in the CG activation DCI. The UE may refrain from transmitting in configured CG occasions 415 prior to receiving the CG activation DCI.

The base station may transmit CG reactivation DCI to the UE to change the communication parameters for the CG PUSCH communications. Based at least in part on receiving the CG reactivation DCI, and the UE may begin transmitting in the scheduled CG occasions 415 using the communication parameters indicated in the CG reactivation DCI. For example, beginning with a next scheduled CG occasion 415 subsequent to receiving the CG reactivation DCI, the UE may transmit PUSCH communications in the scheduled CG occasions 415 based at least in part on the communication parameters indicated in the CG reactivation DCI.

In some cases, such as when the base station needs to override a scheduled CG communication for a higher priority communication, the base station may transmit CG cancellation DCI to the UE to temporarily cancel or deactivate one or more subsequent CG occasions 415 for the UE. The CG cancellation DCI may deactivate only a subsequent one CG occasion 415 or a subsequent N CG occasions 415 (where N is an integer). CG occasions 415 after the one or more (e.g., N) CG occasions 415 subsequent to the CG cancellation DCI may remain activated. Based at least in part on receiving the CG cancellation DCI, the UE may refrain from transmitting in the one or more (e.g., N) CG occasions 415 subsequent to receiving the CG cancellation DCI. As shown in example 410, the CG cancellation DCI cancels one subsequent CG occasion 415 for the UE. After the CG occasion 415 (or N CG occasions) subsequent to receiving the CG cancellation DCI, the UE may automatically resume transmission in the scheduled CG occasions 415.

The base station may transmit CG release DCI to the UE to deactivate the CG configuration for the UE. The UE may stop transmitting in the scheduled CG occasions 415 based at least in part on receiving the CG release DCI. For example, the UE may refrain from transmitting in any scheduled CG occasions 415 until another CG activation DCI is received from the base station. Whereas the CG cancellation DCI may deactivate only a subsequent one CG occasion 415 or a subsequent N CG occasions 415, the CG release DCI deactivates all subsequent CG occasions 415 for a given CG configuration for the UE until the given CG configuration is activated again by a new CG activation DCI.

As described below, the UE 120 may be configured to determine a transmit power for a HARQ-ACK transmission that includes at least one of a deferred SPS HARQ-ACK or a retransmitted HARQ-ACK codebook.

As indicated above, FIG. 4 is provided as an example. Other examples may differ from what is described with respect to FIG. 4.

Figure 5A:
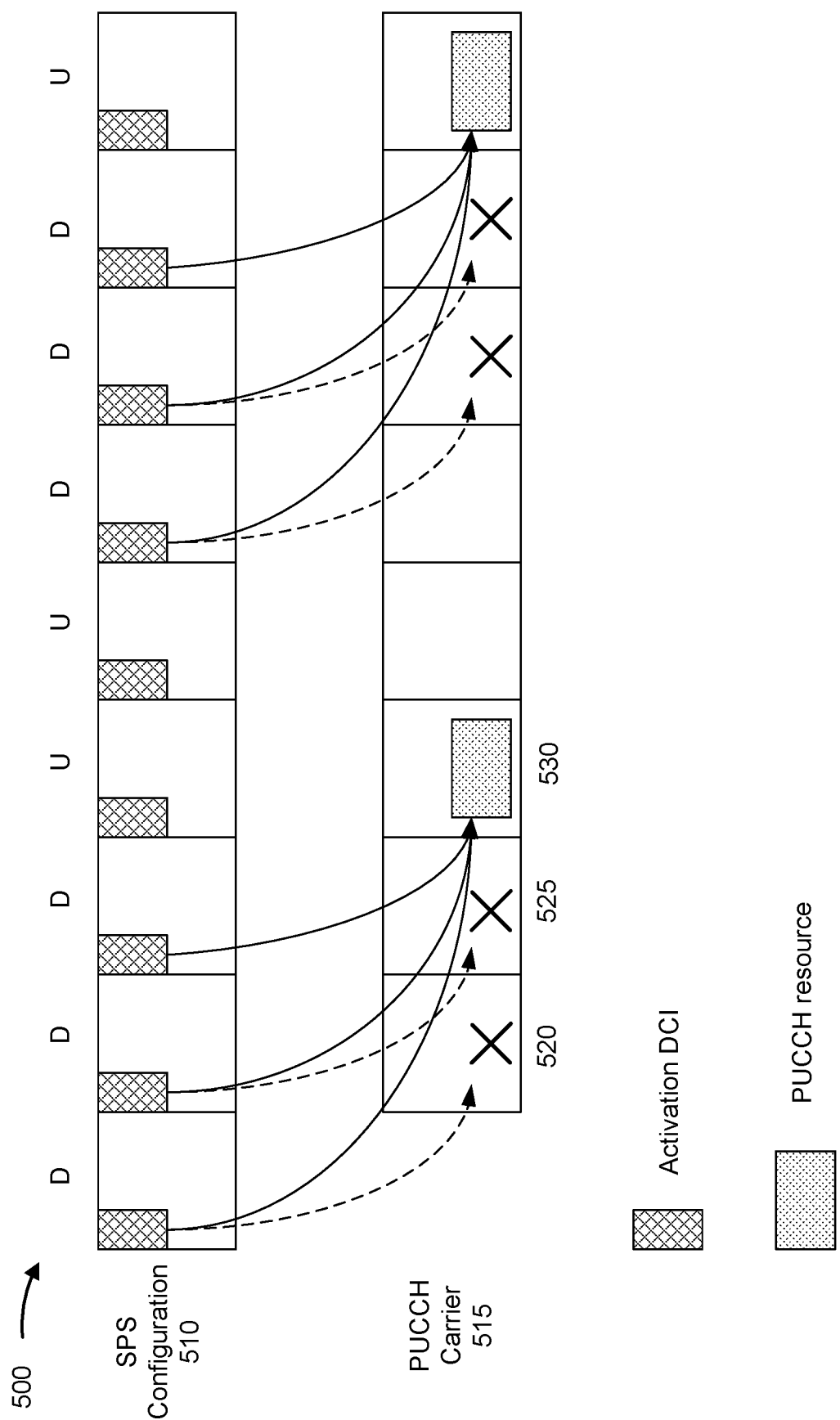
FIGS. 5A and 5B are diagrams illustrating examples of a deferred semi-persistent scheduling (SPS) hybrid automatic repeat request acknowledgement (HARQ-ACK) and a retransmitted HARQ-ACK codebook, respectively, in accordance with the present disclosure.
Figure 5B:
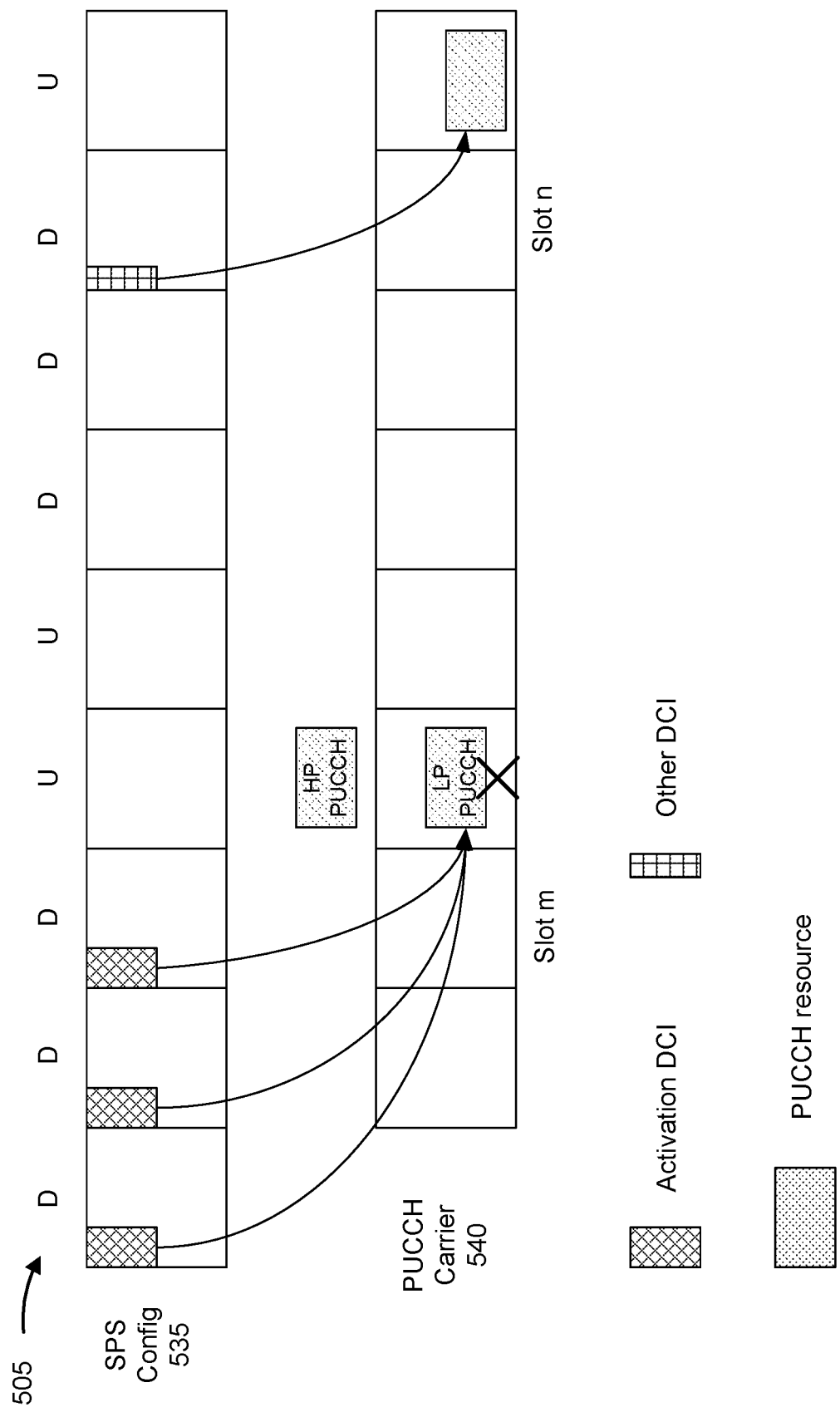

FIGS. 5A and 5B are diagrams illustrating an example 500 of a deferred SPS HARQ-ACK and an example 505 of a HARQ-ACK codebook retransmission, respectively, in accordance with the present disclosure.

As shown in FIG. 5A, downlink SPS may be supported for periodic traffic. The UE 120 may receive the SPS configuration via an RRC message transmitted by the base station 110. The SPS configuration may indicate a resource allocation associated with SPS downlink communications (e.g., in a time domain, frequency domain, spatial domain, and/or code domain) and a periodicity at which the resource allocation is repeated, resulting in periodically reoccurring scheduled SPS occasions for the UE 120. The SPS configuration may also configure HARQ-ACK feedback resources for the UE 120 to transmit HARQ-ACK feedback for SPS PDSCH communications received in the SPS occasions. In some cases, the UE 120 may be configured with periodic PUCCH resources to report the HARQ-ACK feedback for the SPS PDSCHs.

In some cases (e.g., as described in Release 15 and Release 16 of the 3GPP specifications), for time division duplexing (TDD) systems, if a slot that is scheduled for reporting the HARQ-ACK for the SPS is a downlink slot, or if any of the symbols for the scheduled PUCCH carrying the HARQ-ACK is a downlink symbol, the UE 120 may not transmit the HARQ-ACK. In some cases, this may result in wasted system resources, for example, since the base station 110 may need to retransmit the SPS PDSCH due to the missed HARQ-ACK report. As shown in the example 500, the first slot 520 and the second slot 525 of the PUCCH carrier 515 may be scheduled for reporting the HARQ-ACK for the SPS. However, the first slot 520 and the second slot 525 of the PUCCH carrier 515 may correspond to a downlink slot. Thus, the UE 120 may not transmit the HARQ-ACK in the first slot 520 or the second slot 525. Therefore, the HARQ-ACK may go unreported.

In some cases (e.g., as described in Release 17 of the 3GPP specifications), the HARQ-ACK feedback transmission may be delayed to one or more other uplink symbols or slots. This may be referred to as deferring the HARQ-ACK for SPS PDSCH, and the corresponding HARQ-ACK bit(s) that get deferred may be referred to as the deferred HARQ-ACK feedback (or deferred SPS HARQ-ACK feedback, or deferred HARQ-ACK feedback for SPS PDSCH). As shown in the example 500, the UE 120 may be configured to defer the HARQ-ACK until the next uplink slot (or any future uplink slot). For example, the first slot 520 and the second slot 525 of the PUCCH carrier 515 may be downlink slots. Thus, the UE 120 may transmit the HARQ-ACK in the third slot 530, which is scheduled for the uplink. In some cases, the UE 120 may feedback multiple HARQ-ACKs in the uplink slot, such as feedback HARQ-ACK information that were deferred from the first slot 520 and the second slot 525, as well as the other HARQ-ACK information, such as a HARQ-ACK feedback that was originally scheduled for the third slot 530.

As shown in FIG. 5B, a HARQ-ACK that is scheduled to be transmitted in a slot may be dropped or cancelled due to a conflict with a downlink symbol, or due to overlapping with another uplink transmission of a higher priority. In some cases, a high priority (HP) transmission (e.g., an uplink transmission that is associated with priority index 1) may conflict with a low priority (LP) transmission (e.g., an uplink transmission that is associated with priority index 0). In this case, the base station 110 may transmit DCI (e.g., DCI format 1_1/1_2) to trigger the UE 120 to retransmit the HARQ-ACK codebook in another slot. As shown in the example 505, the HARQ-ACK transmission in the slot m may be dropped or cancelled, such as because of a conflict with a downlink symbol or a higher priority uplink transmission. The base station 110 may transmit DCI that indicates for the UE 120 to retransmit the HARQ-ACK codebook that was dropped in slot m=n−x in slot n+k, where x and k are signaled in the DCI.

In some cases, for both the deferred SPS HARQ-ACK and the retransmitted HARQ-ACK codebook, if the reporting of the HARQ-ACK collides with the reporting of another HARQ-ACK (e.g., a dynamic or non-deferred SPS HARQ-ACK), the UE 120 may append the deferred SPS HARQ-ACK or the retransmitted HARQ-ACK codebook information to the other HARQ-ACK.

In some cases, uplink power control may be used to limit intracell and intercell interference, to reduce a power consumption of the UE 120, and to make sure that the receiver (e.g., at the base station) may be able to decode the transmission from the UE successfully. The uplink power control may be used for the PUSCH, PUCCH, PRACH, or sounding reference signal (SRS). For PUCCH, the transmit power may be determined according to the following example formula:

$$P_{PUCCH} = \min\{P_{C,max}, P_0(j) + PL(q) + 10\log_{10}(2^\mu M_{RB}) + \Delta_F + \Delta_{TF} + g(l)\},$$

where:

$P_{C,max}$ is the maximum transmit power from the UE 120;

$P_0(j)$ is the open loop power control parameter (intended receive power at the base station);

PL(q) is the path-loss measured by DL reference signals;

q is the path-loss index (e.g., useful for beam-based power control);

$M_{RB}$ is the number RBs of PUCCH transmission;

$\Delta_F$ is an RRC configured parameter specific for a PUCCH format;

$\Delta_{TF}$ is a delta power based on the spectral efficiency or bit per resource element (BPRE) of PUCCH and based on the format of PUCCH;

In some cases (e.g., for PUCCH formats 2-4):

$\Delta_{TF} = 10\log_{10}((2^{BPRE \cdot K_2} - 1))$ when total number of uplink control information (UCI) bits>11, where $K_2 = 2.4$;

$$\Delta_{TF} = 10\log_{10}\left(K_1 \frac{(n_{HARQ-ACK} + O_{SR} + O_{CSI})}{N_{RE}}\right)$$

when a total number of UCI bits is smaller than or equal to 11 bits, where $N_{RE}$ denotes the number of REs used to transmit the UCI, $K_1 = 6$ is a constant, and $n_{HARQ-ACK}$ denotes the number of "non-dummy/actual" HARQ-ACK bits included in the PUCCH.

g(l) is the closed-loop power control.

In some cases, $n_{HARQ-ACK} \leq O_{HARQ-ACK}$, where the latter is the total number of HARQ-ACK bits included in the PUCCH, including dummy (NACK) and non-dummy/actual HARQ-ACK bits.

In some cases, the dummy bits may be the NACK bits that the UE 120 inserted into the HARQ-ACK codebook when building the Type-1 or Type-2 HARQ-ACK codebook. In some cases, the dummy bits may be known to the base station 110 prior to the UE 120 transmitting the HARQ-ACK codebook. Thus, the base station 110 could use this information in the decoder to decode the unknown HARQ-ACK bits. As described herein, the UE 120 may not need to count these dummy bits when determining the transmit power.

In some cases, for Type-1 HARQ-ACK codebooks (e.g., semi-static HARQ-ACK codebooks), the UE 120 may determine one or more PDSCH reception occasions according to one or more RRC configurations and may report the HARQ-ACK bit for each PDSCH reception occasion, regardless of whether there is actually a PDSCH received in a particular occasion or not. In some cases, if the UE 120 does not receive anything in an occasion, the UE 120 may report a dummy NACK to the base station 110. The base station 110 may know the location and the value of the dummy NACK in the Type-1 HARQ-ACK codebook.

In some cases, for Type-2 HARQ-ACK codebooks (e.g., dynamic HARQ-ACK codebooks), the UE 120 may determine the HARQ-ACK bits according to the DCI, and in particular, the counter or total downlink assignment index (DAI) and the number of HARQ-ACK bits per PDSCH transmission. In some cases, if the UE 120 is configured with transport block (TB) based HARQ-ACK feedback, and is configured with one TB per PDSCH, then only one bit of feedback may be transmitted to the base station 110 per PDSCH. In this case, there may be no need to insert the dummy bits.

In some cases, if the UE 120 is configured with TB based HARQ-ACK feedback and is configured with a maximum of two codewords scheduled by DCI (e.g., maxNrofCodeWordsScheduledByDCI=2) then two bits of feedback may be transmitted for each PDSCH, regardless of the actual number of TBs in the PDSCH. In some cases, if the actual number of TBs per PDSCH is one, then one extra dummy NACK bit may be inserted.

In some cases, if the UE 120 is configured with codeblock group (CBG) based transmission (e.g., via PDSCH-CodeBlockGroupTransmission), then the UE 120 may generate $N_{HARQ\text{-}ACK}^{CBG/TB,max}$ HARQ-ACK bits per TB, where $N_{HARQ\text{-}ACK}^{CBG/TB,max}$ denotes the maximum number of CBGs that can be contained in a TB. In some cases, if the actual number of CBGs per TB is less than $N_{HARQ\text{-}ACK}^{CBG/TB,max}$, the UE 120 may insert a number of dummy NACKs to make the total number of HARQ-ACK bits per TB equal to $N_{HARQ\text{-}ACK}^{CBG/TB,max}$.

In some cases, for type-2 HARQ-ACK codebook, the dummy NACK may be needed. For example, if the UE 120 misses a downlink grant, the UE 120 may not know the actual number of CBGs or TBs per PDSCH. Therefore, UE 120 may not be able to use the actual number of bits as the quantity of bits to report to the base station 110 for the PDSCH of the missing DCI. In some cases, the UE 120 may be able to detect that a DCI is missing by checking the DAI values in two adjacent received DCIs.

As described herein, when a HARQ-ACK transmission includes one or more of a deferred SPS HARQ-ACK or a retransmitted HARQ-ACK codebook, the UE may not be able to accurately determine the number of bits for calculating a transmit power. For example, the UE may not be able to distinguish between dummy bits (e.g., bits that are known to a network node prior to receiving the HARQ-ACK) and actual bits (e.g., bits that are not known to the network node prior to receiving the HARQ-ACK). Thus, the UE may transmit the HARQ-ACK with a higher power than is actually needed. This may cause interference with other UEs in the network and/or may use more power resources of the UE than are necessary.

Techniques and apparatuses are described herein for power control for HARQ-ACK transmission. In some aspects, the UE may obtain one or more of a number of actual bits or a number of dummy bits associated with a HARQ-ACK transmission. The HARQ-ACK transmission may include one or more of a deferred SPS HARQ-ACK or a retransmitted HARQ-ACK codebook. The UE 120 may transmit the HARQ-ACK using a power for a PUCCH that is based at least in part on the number of actual bits, the number of dummy bits, or a total number of bits that is a sum of the number of actual bits and the number of dummy bits. This may decrease the power of the HARQ-ACK transmission, thereby reducing the likelihood of interference with other UEs and reducing the number of UE power resources that are needed.

As indicated above, FIG. 5 is provided as an example. Other examples may differ from what is described with respect to FIG. 5.

Figure 6:
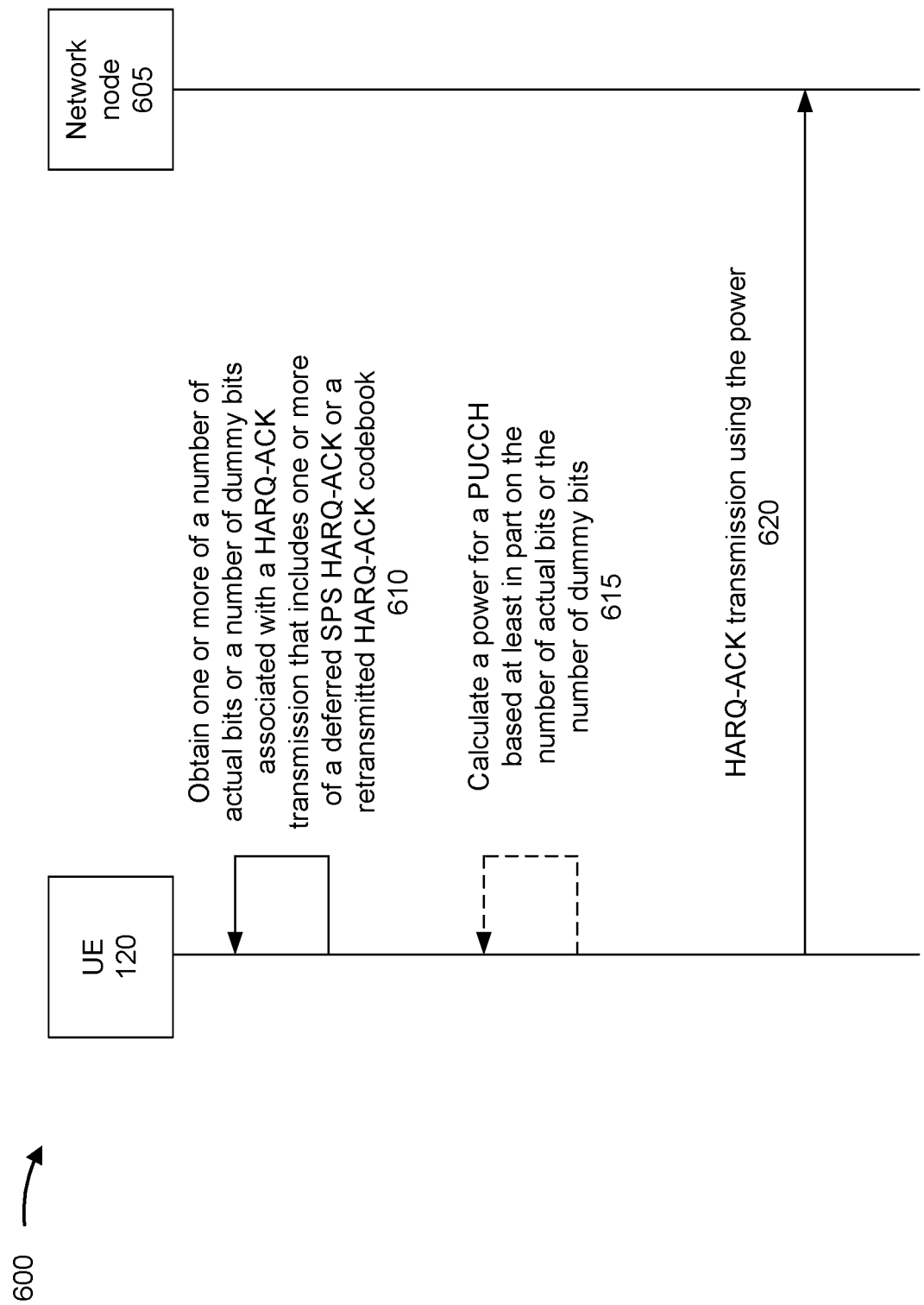
FIG. 6 is a diagram illustrating an example associated with power control for HARQ-ACK transmission, in accordance with the present disclosure.

FIG. 6 is a diagram illustrating an example 600 of power control for HARQ-ACK transmission, in accordance with the present disclosure. The UE 120 may communicate with a network node 605. The network node 605 may include some or all of the features of a base station, such as the base station described above in connection with the aggregated or the disaggregated base station architecture.

As shown in connection with reference number 610, the UE 120 may obtain one or more of a number of actual bits or a number of dummy bits associated with a HARQ-ACK transmission that includes one or more of a deferred SPS HARQ-ACK or a retransmitted HARQ-ACK codebook. The number of dummy bits may be one or more bits that are known to the network node 605 prior to receiving the HARQ-ACK transmission (e.g., the HARQ-ACK transmission shown in connection with reference number 620). In contrast, the number of actual bits may be one or more bits that are not known to the network node 605 prior to receiving the HARQ-ACK transmission.

As shown in connection with reference number 615, the UE 120 may calculate a power (e.g., a transmit power) for the HARQ-ACK. For example, the UE 120 may calculate a power for a PUCCH based at least in part on the number of actual bits, the number of dummy bits, or a total number of bits that includes the number of actual bits and the number of dummy bits. For example, the total number of bits may be equal to a sum of the number of actual bits and the number of dummy bits.

In a first example, the HARQ-ACK may include the deferred SPS HARQ-ACK. In this case, the number of bits for calculating the transmit power may be equal to the total number of bits in the deferred SPS HARQ-ACK. For example, for power control for a PUCCH that includes one or more of a deferred SPS HARQ-ACK, the number of actual HARQ-ACK bits used for the deferred SPS HARQ-ACK in the power control is equal to the total number of deferred SPS HARQ-ACK bits in the PUCCH. In this case, no dummy bits are included for the deferred SPS HARQ-ACK information. Thus, all of the transmitted bits for the deferred SPS HARQ-ACK may be actual HARQ-ACK bits.

In some aspects, if the PUCCH also includes other HARQ-ACK bits (e.g., for dynamically scheduled SPS HARQ-ACK), the UE 120 may use the actual number of other HARQ-ACK bits plus the deferred SPS HARQ-ACK information bits as the number of bits ($n_{HARQ\text{-}ACK}$) for calculating the power for the HARQ-ACK transmission.

In a second example, the number of bits for calculating the transmit power may be equal to the actual number of bits in the original HARQ-ACK codebook that corresponds to the retransmitted HARQ-ACK codebook. For example, for power control for a PUCCH that includes at least one retransmitted HARQ-ACK codebook, the UE 120 may use the actual number of information bits (e.g., non-dummy bits) in the original HARQ-ACK codebook as the number of bits ($n_{HARQ\text{-}ACK}$) for calculating the transmit power.

In some cases, for a transmission on a PUCCH, when the CBG is not configured, then the number of bits for determining the transmit power ($n_{HARQ\text{-}ACK}$) may be computed as follows:

$$n_{HARQ\text{-}ACK} = (V_{DAI}^{DL} - \Sigma_c U_{DAI,c}) \bmod(T_D) * N_{TB,max}^{DL} + \Sigma_c(N_{dynamic,c} + N_{SPS,c}), \text{ where,}$$

$N_{dynamic,c}$ is the number of dynamic TBs on cell c,
$N_{SPS,c}$ is the number of DL SPSs received on cell c,
$V_{DAI}^{DL}$ is the DL DAI, and
$U_{DAI,c}$ is the number of received DCI formats on cell c (e.g., all summation is over serving cells indexed by c configured to the UE).

In this case, as described above, the number of bits $n_{HARQ\text{-}ACK}$ for calculating the transmit power may be equal to the actual number of bits in the original HARQ-ACK codebook that corresponds to the retransmitted HARQ-ACK codebook.

In some aspects, if the original HARQ-ACK codebook was scheduled to transmit on a PUCCH, then the UE 120 may have already computed the number of bits ($n_{HARQ\text{-}ACK}$).

In some aspects, if the original HARQ-ACK codebook was scheduled to transmit on a PUSCH, then the UE 120 may compute the number of bits ($n_{HARQ\text{-}ACK}$) similarly as for the case when the HARQ-ACK codebook is reported on the PUCCH, with the modification that the downlink (DL) downlink assignment index (DAI) (DL-DAI) is replaced with the uplink DAI (UL-DAI). The UL-DAI may be the DAI value of the UE 120 received from the UL grant for the PUSCH.

As described above, if the original HARQ-ACK was scheduled to transmit on a PUSCH, the UE 120 may replace $V_{DAI}^{DL}$ with $V_{T-DAI}^{UL}$ (which may be the DAI that the UE 120 receives in an uplink grant). The UL DAI may indicate any additional missing PDSCHs between the last received DL grants (that provides $V_{DAI}^{UL}$) and the UL grant. Additional details regarding these features are described in connection with FIG. 7.

In some cases, the above procedure may apply when the retransmitted HARQ-ACK is a Type-2 HARQ-ACK codebook. For example, if the retransmitted HARQ-ACK is a Type-1 HARQ-ACK codebook, the UE 120 may use the following equation to compute the number of actual bits for the retransmitted HARQ-ACK:

$$n_{HARQ-ACK} = \sum_{c=0}^{N_{cells}^{DL}-1} \sum_{m=0}^{M_c-1} N_{m,c}^{received} + \sum_{c=0}^{N_{cells}^{DL}-1} \sum_{m=0}^{M_c-1} N_{m,c}^{received,CBG}$$

$N_{m,c}^{received}$ is the number of transport blocks the UE 120 receives in PDSCH reception occasion m for serving cell c, and $N_{m,c}^{received,CBG}$ is the number of CBGs the UE 120 receives in a PDSCH reception occasion m for serving cell c.

In this case, as described above, the number of bits $n_{HARQ-ACK}$ for calculating the transmit power may be equal to the actual number of bits in the original HARQ-ACK codebook that corresponds to the retransmitted HARQ-ACK codebook.

In a third example, the HARQ-ACK may include at least one retransmitted HARQ-ACK codebook, and the number of bits for calculating the transmit power may be equal to the total number of bits in the original HARQ-ACK codebook that corresponds to the retransmitted HARQ-ACK codebook. For example, for power control for a PUCCH that includes at least one retransmitted HARQ-ACK codebook, the UE 120 may use the total number of information bits in the original HARQ-ACK codebook as the number of bits ($n_{HARQ-ACK}$) for the retransmitted HARQ-ACK codebook. In this case, the dummy bits in the original HARQ-ACK codebook are not excluded for the power control.

In some aspects, using the total number of bits for calculating the transmit power may simplify the computation by the UE 120. For example, the UE 120 may not need to keep track of the number of actual bits in the original HARQ-ACK codebook. Additionally, using the total number of bits for calculating the transmit power may simplify the computation by the network node 605. For example, at the time when the transmission is decoded, the network node 605 may not need to track which bits are dummy bits and which bits are actual bits. The network node 605 could simply treat all HARQ-ACK information bits associated with the retransmitted HARQ-ACK codebook as unknown bits in the decoding.

In some aspects, the UE 120 may perform the process as described in the second example if the PUCCH transmission only contains the retransmitted HARQ-ACK codebook. For example, the UE 120 may use the actual number of bits in the original HARQ-ACK codebook when calculating the transmit power. Alternatively, the UE 120 may perform the process as described in the third example if the PUCCH transmission contains the retransmitted HARQ-ACK codebook in addition to other HARQ-ACK information. For example, the UE 120 may use the total number of bits in the original HARQ-ACK codebook when calculating the transmit power.

In some aspects, if the PUCCH transmission includes only the retransmitted HARQ-ACK codebook, the network node 605 may be able to easily determine the actual number of HARQ-ACK bits and the location of the actual bits in the HARQ-ACK codebook. However, if the PUCCH includes both the retransmitted HARQ-ACK bits and other HARQ-ACK bits, this information may be more difficult to determine (and thus, the network node 605 may use the total number of bits).

In some aspects, if only the retransmitted HARQ-ACK codebook is included in the PUCCH, the UE 120 may track which bits are actual bits, and which bits are dummy bits. However, if the PUCCH includes both the retransmitted HARQ-ACK codebook and other type of HARQ-ACK, then it may be difficult for the UE 120 to track everything. For this reason, the UE 120 may use different procedures for power control depending on whether the PUCCH includes only the retransmitted HARQ-ACK codebooks or whether the PUCCH contains multiple HARQ-ACK codebooks (or other HARQ-ACK in addition to the retransmitted HARQ-ACK codebook).

In some aspects, the PUCCH transmission may include more than one type of HARQ-ACK information. For example, the PUCCH transmission may include a first type of HARQ-ACK information corresponding to a deferred SPS HARQ-ACK, a retransmitted HARQ-ACK codebook, or a regular HARQ-ACK, and a second type of HARQ-ACK information corresponding to another of the deferred SPS HARQ-ACK, the retransmitted HARQ-ACK codebook, or the regular HARQ-ACK.

In some aspects, the UE 120 may separately determine the number of bits ($n_{HARQ-ACK}$) for each of the types of HARQ-ACK information and may take the sum of them as the number of bits ($n_{HARQ-ACK}$) to be used for the power control equation. For example, the UE 120 may separately determine a first number of bits for the first type of HARQ-ACK information and a second number of bits for the second type of HARQ-ACK information and may use the sum of the first number of bits and the second number of bits for determining the transmit power.

In some aspects, the UE 120 may use the total number of HARQ-ACK bits (regardless of the codebook type, and not excluding the dummy HARQ-ACK bits) as the number of bits ($n_{HARQ-ACK}$) to be used in the power control equation. For example, the UE 120 may use the total number of HARQ-ACK bits for a HARQ-ACK that includes the first type of HARQ-ACK and the second type of HARQ-ACK for determining the transmit power.

In some aspects, the HARQ-ACK may be associated with a priority. For example, a first HARQ-ACK (or HARQ-ACK type) may be associated with a first priority (e.g., a high priority), and a second HARQ-ACK (or HARQ-ACK type) may be associated with a second priority (e.g., a low priority). In some aspects, for a transmission that includes a high priority HARQ-ACK and a low priority HARQ-ACK, the UE 120 may only use the bits (e.g., the actual bits, dummy bits, or total bits, as described herein) of the high priority HARQ-ACK for determining the transmit power. For example, for a PUCCH that includes deferred SPS HARQ-ACK or retransmitted HARQ-ACK codebook, and one or more other HARQ-ACK codebooks, the UE may only use the number of HARQ-ACK bits associated with the high priority codebook to determine the transmit power.

As described herein, the UE 120 may determine a transmit power for a HARQ-ACK that includes any combination of a deferred SPS HARQ-ACK, a retransmitted HARQ-ACK codebook, or a regular HARQ-ACK (e.g. a scheduled HARQ-ACK). In some aspects, the HARQ-ACK may include a deferred SPS HARQ-ACK only. In some aspects, the HARQ-ACK may include a retransmitted HARQ-ACK codebook only. In some aspects, the HARQ-ACK may include a deferred SPS HARQ-ACK and a regular HARQ-ACK. In some aspects, the HARQ-ACK may include a retransmitted HARQ-ACK codebook and a regular HARQ-ACK. In some aspects, the HARQ-ACK may include a deferred SPS HARQ-ACK and a retransmitted HARQ-ACK codebook. In some aspects, the HARQ-ACK may include a deferred SPS HARQ-ACK, a retransmitted HARQ-ACK codebook, and a regular HARQ-ACK. The UE 120 may be configured to calculate a transmit power for a HARQ-ACK that includes any of the above combinations, as well as other combinations not described above.

In some aspects, the UE 120 may be configured to concatenate a plurality of HARQ-ACKs. For example, in a PUCCH transmission that includes both a deferred SPS HARQ-ACK and a retransmitted HARQ-ACK codebook (and possibly other HARQ-ACK codebooks), the UE 120 may concatenate the plurality of HARQ-ACKs. In some aspects, the concatenation may include the deferred SPS HARQ-ACK followed by the retransmitted HARQ-ACK codebook. If a regular HARQ-ACK is included, the concatenation may include the regular HARQ-ACK, followed by the deferred SPS HARQ-ACK and the retransmitted HARQ-ACK codebook. In some aspects, the concatenation may include the retransmitted HARQ-ACK codebook followed by the deferred SPS HARQ-ACK. If a regular HARQ-ACK is included, the concatenation may include the regular HARQ-ACK, followed by the retransmitted HARQ-ACK codebook and the deferred SPS HARQ-ACK.

As shown in connection with reference number 620, the UE 120 may transmit the HARQ-ACK using the determined transmit power. For example, the UE 120 may transmit, and the network node 605 may receive, the HARQ-ACK using the power for the PUCCH that is based at least in part on the number of actual bits, the number of dummy bits, or the total number of bits.

As described herein, when a HARQ-ACK transmission includes one or more of a deferred SPS HARQ-ACK or a retransmitted HARQ-ACK codebook, the UE 120 may not be able to accurately determine the number of bits for calculating a transmit power. For example, the UE 120 may not be able to distinguish between the dummy bits and the actual bits. Thus, the UE 120 may transmit the HARQ-ACK with a higher power than is actually needed. This may cause interference with other UEs in the network and/or may use more power resources of the UE than are necessary. Using the techniques and apparatuses described herein, the UE 120 may transmit the HARQ-ACK using a power for a PUCCH that is based at least in part on the number of actual bits, the number of dummy bits, or the total number of bits. This may decrease the power of the HARQ-ACK transmission, thereby reducing the likelihood of interference with other UEs and the number of UE power resources that are needed.

As indicated above, FIG. 6 is provided as an example. Other examples may differ from what is described with respect to FIG. 6.

Figure 7:
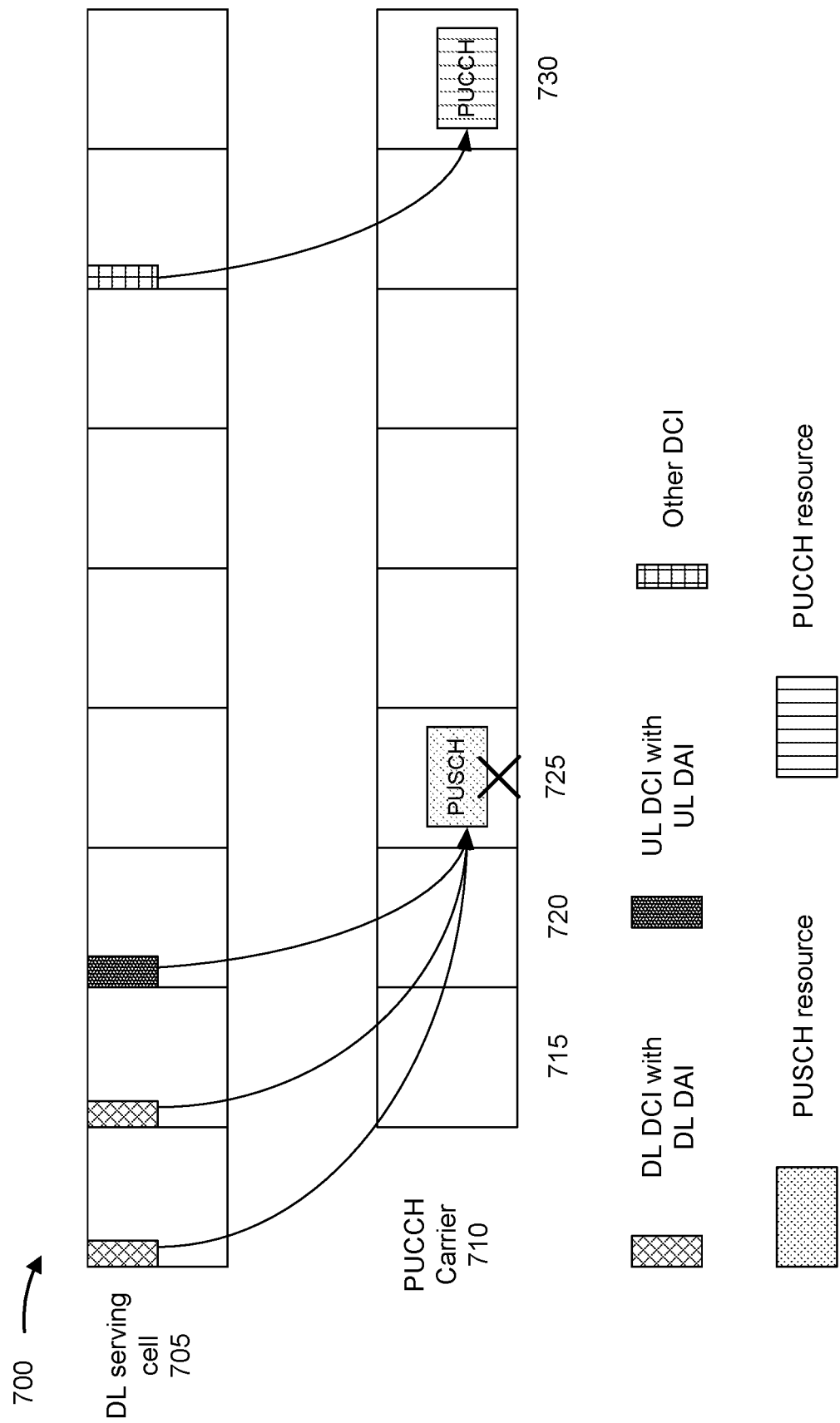
FIG. 7 is a diagram illustrating an example associated with power control for a physical uplink control channel (PUCCH) that includes at least one retransmitted HARQ-ACK codebook, in accordance with the present disclosure.

FIG. 7 is a diagram illustrating an example 700 of power control for a PUCCH that includes at least one retransmitted HARQ-ACK codebook, in accordance with the present disclosure.

In some aspects (e.g., as described in connection with the second example of FIG. 6), the HARQ-ACK may include at least one retransmitted HARQ-ACK codebook. In this case, the number of bits for calculating the transmit power may be equal to the actual number of bits in the original HARQ-ACK codebook that is being retransmitted.

In some aspects, if the original HARQ-ACK codebook was scheduled to transmit on a PUSCH, then the UE 120 may compute the number of bits ($n_{HARQ-ACK}$) similarly as for the case when the HARQ-ACK codebook is reported on the PUCCH, with the modification that the DL-DAI is replaced with the UL-DAI. For example, the number of bits for determining the transmit power ($n_{HARQ-ACK}$) may be computed as follows:

$$n_{HARQ-ACK} = (V_{DAI}^{DL} - \Sigma_c U_{DAI,c}) \mathrm{mod}(T_D) * N_{TB,max}^{DL} + c(N_{dynamic,c} + N_{SPS,c}).$$

As shown in the example 700, the UE 120 may receive DL DCI with DL DAI in a first slot 715 and a second slot 720 associated with a DL serving cell transmission. The UE 120 may receive UL DCI with UL DAI in a third slot 725 associated with the DL serving cell transmission. In this example, the UE 120 may determine a transmit power for the PUCCH (e.g., the PUCCH in the eight slot 730 of the PUCCH carrier) based at least in part on the number of uplink DAIs ($V_{DAI}^{UL}$).

As indicated above, FIG. 7 is provided as an example. Other examples may differ from what is described with respect to FIG. 7.

Figure 8:
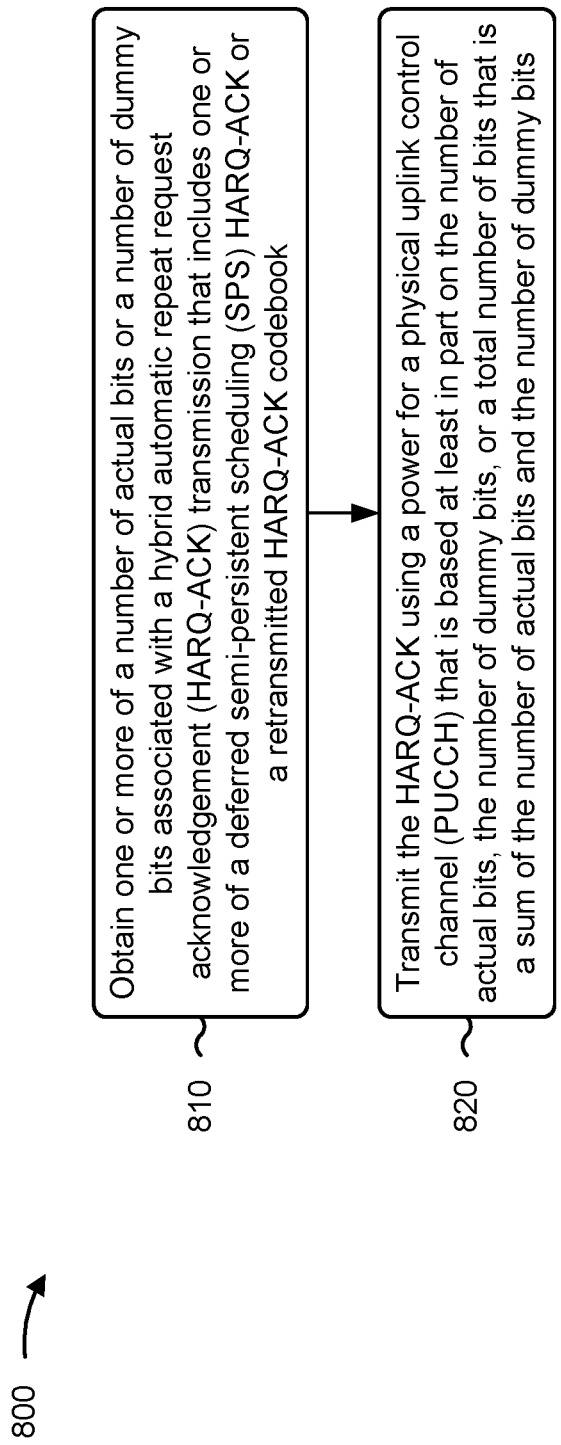
FIG. 8 is a diagram illustrating an example process associated with power control for HARQ-ACK transmission, in accordance with the present disclosure.

FIG. 8 is a diagram illustrating an example process 800 performed, for example, by a UE, in accordance with the present disclosure. Example process 800 is an example where the UE (e.g., UE 120) performs operations associated with power control for HARQ-ACK transmission.

As shown in FIG. 8, in some aspects, process 800 may include obtaining one or more of a number of actual bits or a number of dummy bits associated with a HARQ-ACK transmission that includes one or more of a deferred SPS HARQ-ACK or a retransmitted HARQ-ACK codebook (block 810). For example, the UE (e.g., using communication manager 140 and/or obtaining component 908, depicted in FIG. 9) may obtain one or more of a number of actual bits or a number of dummy bits associated with a HARQ-ACK transmission that includes one or more of a deferred SPS HARQ-ACK or a retransmitted HARQ-ACK codebook, as described above.

As further shown in FIG. 8, in some aspects, process 800 may include transmitting the HARQ-ACK using a power for a PUCCH that is based at least in part on the number of actual bits, the number of dummy bits, or a total number of bits that is a sum of the number of actual bits and the number of dummy bits (block 820). For example, the UE (e.g., using communication manager 140 and/or transmission component 904, depicted in FIG. 9) may transmit the HARQ-ACK using a power for a PUCCH that is based at least in part on the number of actual bits, the number of dummy bits, or a total number of bits that is a sum of the number of actual bits and the number of dummy bits, as described above.

Process 800 may include additional aspects, such as any single aspect or any combination of aspects described below and/or in connection with one or more other processes described elsewhere herein.

In a first aspect, process 800 includes calculating the power based at least in part on the number of actual bits, the number of dummy bits, or the total number of bits.

In a second aspect, alone or in combination with the first aspect, the HARQ-ACK transmission includes the deferred SPS HARQ-ACK.

In a third aspect, alone or in combination with one or more of the first and second aspects, process 800 includes calculating the power based at least in part on a total number of bits for the deferred SPS HARQ-ACK.

In a fourth aspect, alone or in combination with one or more of the first through third aspects, the HARQ-ACK transmission includes the retransmitted HARQ-ACK codebook.

In a fifth aspect, alone or in combination with one or more of the first through fourth aspects, process 800 includes calculating the power based at least in part on an actual number of bits in an original HARQ-ACK codebook corresponding to the retransmitted HARQ-ACK codebook.

In a sixth aspect, alone or in combination with one or more of the first through fifth aspects, calculating the power based at least in part on the actual number of bits in the original HARQ-ACK codebook comprises determining that the HARQ-ACK transmission includes only the retransmitted HARQ-ACK codebook.

In a seventh aspect, alone or in combination with one or more of the first through sixth aspects, process 800 includes determining, based at least in part on the original HARQ-ACK being scheduled on a physical uplink shared channel (PUSCH), the actual number of bits for the original HARQ-ACK based at least in part on an uplink downlink assignment index (DAI), or determining, based at least in part on the original HARQ-ACK being scheduled on the PUCCH, the actual number of bits in the original HARQ-ACK based at least in part on a downlink DAI.

In an eighth aspect, alone or in combination with one or more of the first through seventh aspects, process 800 includes calculating the power based at least in part on a total number of bits in an original HARQ-ACK codebook corresponding to the retransmitted HARQ-ACK codebook.

In a ninth aspect, alone or in combination with one or more of the first through eighth aspects, calculating the power based at least in part on the total number of bits in the original HARQ-ACK codebook comprises determining that the HARQ-ACK transmission includes the retransmitted HARQ-ACK codebook and other HARQ-ACK information.

In a tenth aspect, alone or in combination with one or more of the first through ninth aspects, process 800 includes determining, based at least in part on the original HARQ-ACK being scheduled on a physical uplink shared channel (PUSCH), the actual number of bits for the original HARQ-ACK based at least in part on an uplink downlink assignment index (DAI), or determining, based at least in part on the original HARQ-ACK being scheduled on the PUCCH, the actual number of bits in the original HARQ-ACK based at least in part on a downlink DAI.

In an eleventh aspect, alone or in combination with one or more of the first through tenth aspects, process 800 includes determining that the HARQ-ACK transmission comprises a plurality of HARQ-ACK transmission types, determining the number of actual bits or the number of dummy bits for each of the plurality of HARQ-ACK transmission types, and calculating a combined power based at least in part on the number of actual bits or the number of dummy bits for each of the plurality of HARQ-ACK transmission types.

In a twelfth aspect, alone or in combination with one or more of the first through eleventh aspects, transmitting the HARQ-ACK comprises transmitting the HARQ-ACK using the combined power.

In a thirteenth aspect, alone or in combination with one or more of the first through twelfth aspects, the plurality of HARQ-ACK transmission types comprises two or more of the deferred SPS HARQ-ACK, the retransmitted HARQ-ACK codebook, or a standard HARQ-ACK.

In a fourteenth aspect, alone or in combination with one or more of the first through thirteenth aspects, process 800 includes determining that the HARQ-ACK transmission comprises a plurality of HARQ-ACK transmission types, and calculating a combined power for the plurality of HARQ-ACK transmission types based at least in part on a total number of bits included in the plurality of HARQ-ACK transmission types.

In a fifteenth aspect, alone or in combination with one or more of the first through fourteenth aspects, transmitting the HARQ-ACK comprises transmitting the HARQ-ACK using the combined power.

In a sixteenth aspect, alone or in combination with one or more of the first through fifteenth aspects, the plurality of HARQ-ACK transmission types comprises two or more of the deferred SPS HARQ-ACK, the retransmitted HARQ-ACK codebook, or a standard HARQ-ACK.

In a seventeenth aspect, alone or in combination with one or more of the first through sixteenth aspects, the HARQ-ACK transmission comprises a high priority HARQ-ACK and a low priority HARQ-ACK.

In an eighteenth aspect, alone or in combination with one or more of the first through seventeenth aspects, process 800 includes calculating the power based at least in part on the number of actual bits or the number of dummy bits included in the high priority HARQ-ACK.

In a nineteenth aspect, alone or in combination with one or more of the first through eighteenth aspects, the high priority HARQ-ACK corresponds to the deferred SPS HARQ-ACK or the retransmitted HARQ-ACK codebook.

In a twentieth aspect, alone or in combination with one or more of the first through nineteenth aspects, the HARQ-ACK transmission comprises a concatenation of the deferred SPS HARQ-ACK and the retransmitted HARQ-ACK codebook.

In a twenty-first aspect, alone or in combination with one or more of the first through twentieth aspects, the concatenation comprises the deferred SPS HARQ-ACK followed by the retransmitted HARQ-ACK codebook.

In a twenty-second aspect, alone or in combination with one or more of the first through twenty-first aspects, the concatenation comprises the retransmitted HARQ-ACK codebook followed by the deferred SPS HARQ-ACK.

In a twenty-third aspect, alone or in combination with one or more of the first through twenty-second aspects, the concatenation of the deferred SPS HARQ-ACK and the retransmitted HARQ-ACK codebook is preceded by a standard HARQ-ACK.

In a twenty-fourth aspect, alone or in combination with one or more of the first through twenty-third aspects, process 800 includes calculating the power based at least in part on the total number of bits that is less than or equal to eleven.

In a twenty-fifth aspect, alone or in combination with one or more of the first through twenty-fourth aspects, the PUCCH comprises the deferred SPS HARQ-ACK or the retransmitted HARQ-ACK codebook, and at least one uplink signal.

In a twenty-sixth aspect, alone or in combination with one or more of the first through twenty-fifth aspects, the at least one uplink signal comprises channel state information or a scheduling request.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
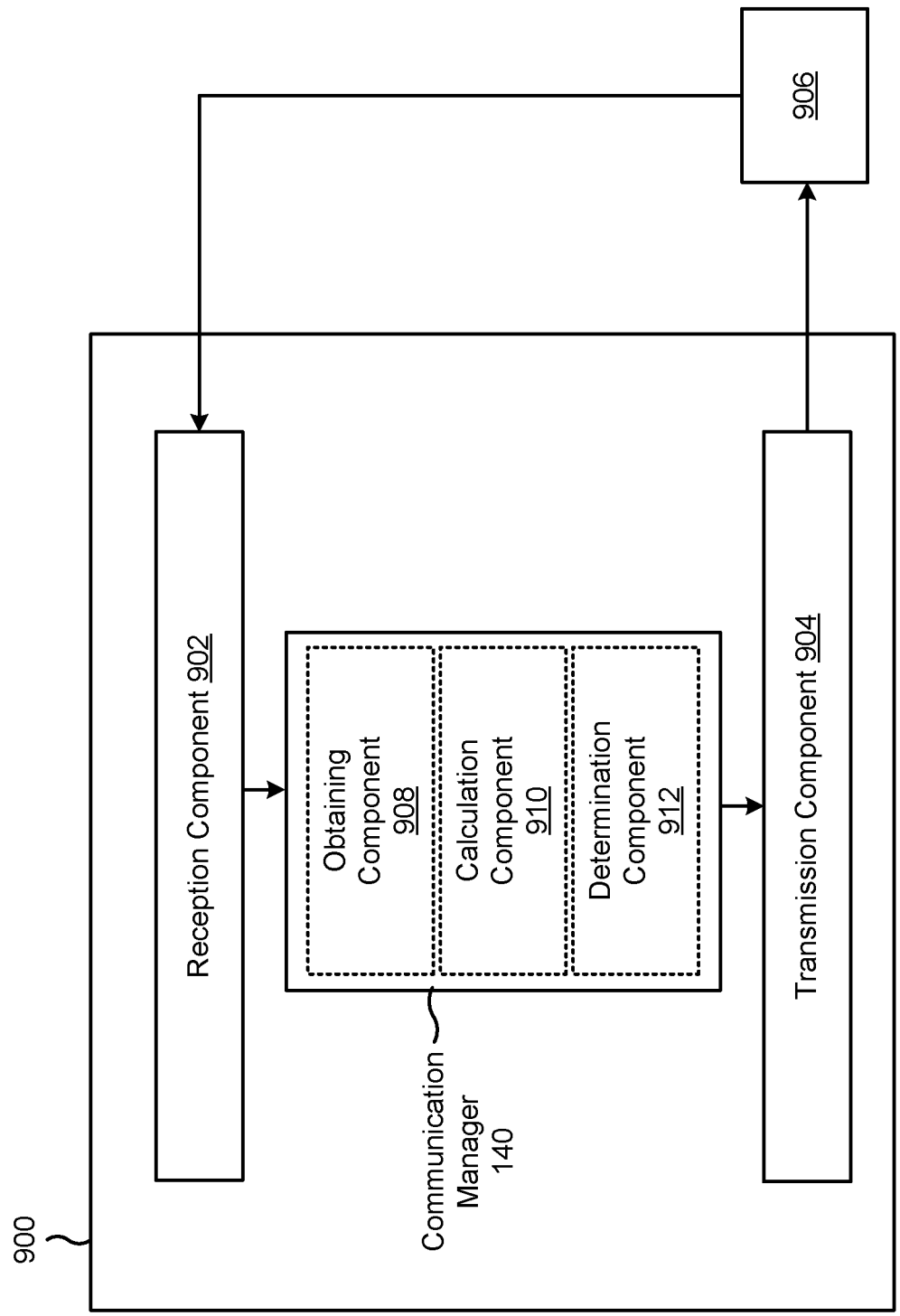
FIG. 9 is a diagram of an example apparatus for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of an obtaining component 908, a calculation component 910, or a determination component 912, among other examples.

In some aspects, the apparatus 900 may be configured to perform one or more operations described herein in connection with FIGS. 7-8. Additionally, or alternatively, the apparatus 900 may be configured to perform one or more processes described herein, such as process 800 of FIG. 8. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The obtaining component 908 may obtain one or more of a number of actual bits or a number of dummy bits associated with a HARQ-ACK transmission that includes one or more of a deferred SPS HARQ-ACK or a retransmitted HARQ-ACK codebook. The transmission component 904 may transmit the HARQ-ACK using a power for a PUCCH that is based at least in part on the number of actual bits, the number of dummy bits, or a total number of bits that is a sum of the number of actual bits and the number of dummy bits.

The calculation component 910 may calculate the power based at least in part on the number of actual bits, the number of dummy bits, or the total number of bits.

The calculation component 910 may calculate the power based at least in part on a total number of bits for the deferred SPS HARQ-ACK.

The calculation component 910 may calculate the power based at least in part on an actual number of bits in an original HARQ-ACK codebook corresponding to the retransmitted HARQ-ACK codebook.

The determination component 912 may determine, based at least in part on the original HARQ-ACK being scheduled on a physical uplink shared channel (PUSCH), the actual number of bits for the original HARQ-ACK based at least in part on an uplink downlink assignment index (DAI).

The determination component 912 may determine, based at least in part on the original HARQ-ACK being scheduled on the PUCCH, the actual number of bits in the original HARQ-ACK based at least in part on a downlink DAI.

The calculation component 910 may calculate the power based at least in part on a total number of bits in an original HARQ-ACK codebook corresponding to the retransmitted HARQ-ACK codebook.

The determination component 912 may determine, based at least in part on the original HARQ-ACK being scheduled on a physical uplink shared channel (PUSCH), the actual number of bits for the original HARQ-ACK based at least in part on an uplink downlink assignment index (DAI).

The determination component 912 may determine, based at least in part on the original HARQ-ACK being scheduled on the PUCCH, the actual number of bits in the original HARQ-ACK based at least in part on a downlink DAI.

The determination component 912 may determine that the HARQ-ACK transmission comprises a plurality of HARQ-ACK transmission types. The determination component 912 may determine the number of actual bits or the number of dummy bits for each of the plurality of HARQ-ACK transmission types. The calculation component 910 may calculate a combined power based at least in part on the number of actual bits or the number of dummy bits for each of the plurality of HARQ-ACK transmission types.

The determination component 912 may determine that the HARQ-ACK transmission comprises a plurality of HARQ-ACK transmission types. The calculation component 910 may calculate a combined power for the plurality of HARQ-ACK transmission types based at least in part on a total number of bits included in the plurality of HARQ-ACK transmission types.

The calculation component 910 may calculate the power based at least in part on the number of actual bits or the number of dummy bits included in the high priority HARQ-ACK.

The calculation component 910 may calculate the power based at least in part on the total number of bits that is less than or equal to eleven.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: obtaining one or more of a number of actual bits or a number of dummy bits associated with a hybrid automatic repeat request acknowledgement (HARQ-ACK) transmission that includes one or more of a deferred semi-persistent scheduling (SPS) HARQ-ACK or a retransmitted HARQ-ACK codebook; and transmitting the HARQ-ACK using a power for a physical uplink control channel (PUCCH) that is based at least in part on the number of actual bits, the number of dummy bits, or a total number of bits that is a sum of the number of actual bits and the number of dummy bits.

Aspect 2: The method of Aspect 1, further comprising calculating the power based at least in part on the number of actual bits, the number of dummy bits, or the total number of bits.

Aspect 3: The method of any of Aspects 1-2, wherein the HARQ-ACK transmission includes the deferred SPS HARQ-ACK.

Aspect 4: The method of Aspect 3, further comprising calculating the power based at least in part on a total number of bits for the deferred SPS HARQ-ACK.

Aspect 5: The method of any of Aspects 1-4, wherein the HARQ-ACK transmission includes the retransmitted HARQ-ACK codebook.

Aspect 6: The method of Aspect 5, further comprising calculating the power based at least in part on an actual number of bits in an original HARQ-ACK codebook corresponding to the retransmitted HARQ-ACK codebook.

Aspect 7: The method of Aspect 6, wherein calculating the power based at least in part on the actual number of bits in the original HARQ-ACK codebook comprises determining that the HARQ-ACK transmission includes only the retransmitted HARQ-ACK codebook.

Aspect 8: The method of Aspect 6, further comprising: determining, based at least in part on the original HARQ-ACK being scheduled on a physical uplink shared channel (PUSCH), the actual number of bits for the original HARQ-ACK based at least in part on an uplink downlink assignment index (DAI); or determining, based at least in part on the original HARQ-ACK being scheduled on the PUCCH, the actual number of bits in the original HARQ-ACK based at least in part on a downlink DAI.

Aspect 9: The method of Aspect 5, further comprising calculating the power based at least in part on a total number of bits in an original HARQ-ACK codebook corresponding to the retransmitted HARQ-ACK codebook.

Aspect 10: The method of Aspect 9, wherein calculating the power based at least in part on the total number of bits in the original HARQ-ACK codebook comprises determining that the HARQ-ACK transmission includes the retransmitted HARQ-ACK codebook and other HARQ-ACK information.

Aspect 11: The method of Aspect 9, further comprising: determining, based at least in part on the original HARQ-ACK being scheduled on a physical uplink shared channel (PUSCH), the actual number of bits for the original HARQ-ACK based at least in part on an uplink downlink assignment index (DAI); or determining, based at least in part on the original HARQ-ACK being scheduled on the PUCCH, the actual number of bits in the original HARQ-ACK based at least in part on a downlink DAI.

Aspect 12: The method of any of Aspects 1-11, further comprising: determining that the HARQ-ACK transmission comprises a plurality of HARQ-ACK transmission types; determining the number of actual bits or the number of dummy bits for each of the plurality of HARQ-ACK transmission types; and calculating a combined power based at least in part on the number of actual bits or the number of dummy bits for each of the plurality of HARQ-ACK transmission types.

Aspect 13: The method of Aspect 12, wherein transmitting the HARQ-ACK comprises transmitting the HARQ-ACK using the combined power.

Aspect 14: The method of Aspect 12, wherein the plurality of HARQ-ACK transmission types comprises two or more of the deferred SPS HARQ-ACK, the retransmitted HARQ-ACK codebook, or a standard HARQ-ACK.

Aspect 15: The method of any of Aspects 1-14, further comprising: determining that the HARQ-ACK transmission comprises a plurality of HARQ-ACK transmission types; and calculating a combined power for the plurality of HARQ-ACK transmission types based at least in part on a total number of bits included in the plurality of HARQ-ACK transmission types.

Aspect 16: The method of Aspect 15, wherein transmitting the HARQ-ACK comprises transmitting the HARQ-ACK using the combined power.

Aspect 17: The method of Aspect 15, wherein the plurality of HARQ-ACK transmission types comprises two or more of the deferred SPS HARQ-ACK, the retransmitted HARQ-ACK codebook, or a standard HARQ-ACK.

Aspect 18: The method of any of Aspects 1-17, wherein the HARQ-ACK transmission comprises a high priority HARQ-ACK and a low priority HARQ-ACK.

Aspect 19: The method of Aspect 18, further comprising calculating the power based at least in part on the number of actual bits or the number of dummy bits included in the high priority HARQ-ACK.

Aspect 20: The method of Aspect 18, wherein the high priority HARQ-ACK corresponds to the deferred SPS HARQ-ACK or the retransmitted HARQ-ACK codebook.

Aspect 21: The method of any of Aspects 1-20, wherein the HARQ-ACK transmission comprises a concatenation of the deferred SPS HARQ-ACK and the retransmitted HARQ-ACK codebook.

Aspect 22: The method of Aspect 21, wherein the concatenation comprises the deferred SPS HARQ-ACK followed by the retransmitted HARQ-ACK codebook.

Aspect 23: The method of Aspect 21, wherein the concatenation comprises the retransmitted HARQ-ACK codebook followed by the deferred SPS HARQ-ACK.

Aspect 24: The method of Aspect 21, wherein the concatenation of the deferred SPS HARQ-ACK and the retransmitted HARQ-ACK codebook is preceded by a standard HARQ-ACK.

Aspect 25: The method of any of Aspects 1-24, further comprising calculating the power based at least in part on the total number of bits that is less than or equal to eleven.

Aspect 26: The method of any of Aspects 1-25, wherein the PUCCH comprises the deferred SPS HARQ-ACK or the retransmitted HARQ-ACK codebook, and at least one uplink signal.

Aspect 27: The method of Aspect 26, wherein the at least one uplink signal comprises channel state information or a scheduling request.

Aspect 28: An apparatus for wireless communication at a device, comprising a processor; memory coupled with the processor; and instructions stored in the memory and executable by the processor to cause the apparatus to perform the method of one or more of Aspects 1-27.

Aspect 29: A device for wireless communication, comprising a memory and one or more processors coupled to the memory, the one or more processors configured to perform the method of one or more of Aspects 1-27.

Aspect 30: An apparatus for wireless communication, comprising at least one means for performing the method of one or more of Aspects 1-27.

Aspect 31: A non-transitory computer-readable medium storing code for wireless communication, the code comprising instructions executable by a processor to perform the method of one or more of Aspects 1-27.

Aspect 32: A non-transitory computer-readable medium storing a set of instructions for wireless communication, the set of instructions comprising one or more instructions that, when executed by one or more processors of a device, cause the device to perform the method of one or more of Aspects 1-27.

The foregoing disclosure provides illustration and description but is not intended to be exhaustive or to limit the aspects to the precise forms disclosed. Modifications and variations may be made in light of the above disclosure or may be acquired from practice of the aspects.

Further disclosure is included in the appendix. The appendix is provided as an example only and is to be considered part of the specification. A definition, illustration, or other description in the appendix does not supersede or override similar information included in the detailed description or figures. Furthermore, a definition, illustration, or other description in the detailed description or figures does not supersede or override similar information included in the appendix. Furthermore, the appendix is not intended to limit the disclosure of possible aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      obtain one or more of a number of actual bits or a number of dummy bits associated with a hybrid automatic repeat request acknowledgement (HARQ-ACK) transmission that includes one or more of a deferred semi-persistent scheduling (SPS) HARQ-ACK or a retransmitted HARQ-ACK codebook; and
      transmit the HARQ-ACK using a power for a physical uplink control channel (PUCCH) that is based at least in part on the number of actual bits, or a total number of bits that is a sum of the number of actual bits and the number of dummy bits.

2. The apparatus of claim 1, wherein the one or more processors are further configured to calculate the power based at least in part on the number of actual bits, or the total number of bits.

3. The apparatus of claim 1, wherein the HARQ-ACK transmission includes the deferred SPS HARQ-ACK.

4. The apparatus of claim 3, wherein the one or more processors are further configured to calculate the power based at least in part on a total number of bits for the deferred SPS HARQ-ACK.

5. The apparatus of claim 1, wherein the HARQ-ACK transmission includes the retransmitted HARQ-ACK codebook.

6. The apparatus of claim 5, wherein the one or more processors are further configured to calculate the power based at least in part on an actual number of bits in an original HARQ-ACK codebook corresponding to the retransmitted HARQ-ACK codebook.

7. The apparatus of claim 6, wherein the one or more processors, to calculate the power based at least in part on the actual number of bits in the original HARQ-ACK codebook, are configured to determine that the HARQ-ACK transmission includes only the retransmitted HARQ-ACK codebook.

8. The apparatus of claim 6, wherein the one or more processors are further configured to:
  determine, based at least in part on the original HARQ-ACK codebook being scheduled on a physical uplink shared channel (PUSCH), the actual number of bits for the original HARQ-ACK codebook based at least in part on an uplink downlink assignment index (DAI); or
  determine, based at least in part on the original HARQ-ACK codebook being scheduled on the PUCCH, the actual number of bits in the original HARQ-ACK codebook based at least in part on a downlink DAI.

9. The apparatus of claim 5, wherein the one or more processors are further configured to calculate the power based at least in part on a total number of bits in an original HARQ-ACK codebook corresponding to the retransmitted HARQ-ACK codebook.

10. The apparatus of claim 9, wherein the one or more processors, to calculate the power based at least in part on the total number of bits in the original HARQ-ACK codebook, are configured to determine that the HARQ-ACK transmission includes the retransmitted HARQ-ACK codebook and other HARQ-ACK information.

11. The apparatus of claim 9, wherein the one or more processors are further configured to:
  determine, based at least in part on the original HARQ-ACK codebook being scheduled on a physical uplink shared channel (PUSCH), the actual number of bits for the original HARQ-ACK codebook based at least in part on an uplink downlink assignment index (DAI); or
  determine, based at least in part on the original HARQ-ACK codebook being scheduled on the PUCCH, the actual number of bits in the original HARQ-ACK codebook based at least in part on a downlink DAI.

12. The apparatus of claim 1, wherein the one or more processors are further configured to:
  determine that the HARQ-ACK transmission comprises a plurality of HARQ-ACK transmission types;
  determine the number of actual bits for each of the plurality of HARQ-ACK transmission types; and
  calculate a combined power based at least in part on the number of actual bits for each of the plurality of HARQ-ACK transmission types.

13. The apparatus of claim 12, wherein the one or more processors, to transmit the HARQ-ACK, are configured to transmit the HARQ-ACK using the combined power.

14. The apparatus of claim 12, wherein the plurality of HARQ-ACK transmission types comprises two or more of the deferred SPS HARQ-ACK, the retransmitted HARQ-ACK codebook, or a standard HARQ-ACK.

15. The apparatus of claim 1, wherein the one or more processors are further configured to:
  determine that the HARQ-ACK transmission comprises a plurality of HARQ-ACK transmission types; and
  calculate a combined power for the plurality of HARQ-ACK transmission types based at least in part on a total number of bits included in the plurality of HARQ-ACK transmission types.

16. The apparatus of claim 15, wherein the one or more processors, to transmit the HARQ-ACK, are configured to transmit the HARQ-ACK using the combined power.

17. The apparatus of claim 15, wherein the plurality of HARQ-ACK transmission types comprises two or more of the deferred SPS HARQ-ACK, the retransmitted HARQ-ACK codebook, or a standard HARQ-ACK.

18. The apparatus of claim 1, wherein the HARQ-ACK transmission comprises a high priority HARQ-ACK and a low priority HARQ-ACK.

19. The apparatus of claim 18, wherein the one or more processors are further configured to calculate the power based at least in part on the number of actual bits or the number of dummy bits included in the high priority HARQ-ACK.

20. The apparatus of claim 18, wherein the high priority HARQ-ACK corresponds to the deferred SPS HARQ-ACK or the retransmitted HARQ-ACK codebook.

21. The apparatus of claim 1, wherein the HARQ-ACK transmission comprises a concatenation of the deferred SPS HARQ-ACK and the retransmitted HARQ-ACK codebook.

22. The apparatus of claim 21, wherein the concatenation comprises the retransmitted HARQ-ACK codebook followed by the deferred SPS HARQ-ACK.

23. The apparatus of claim 21, wherein the concatenation of the deferred SPS HARQ-ACK and the retransmitted HARQ-ACK codebook is preceded by a standard HARQ-ACK.

24. The apparatus of claim 1, wherein the one or more processors are further configured to calculate the power based at least in part on the total number of bits that is less than or equal to eleven.

25. The apparatus of claim 1, wherein the PUCCH comprises the deferred SPS HARQ-ACK or the retransmitted HARQ-ACK codebook, and at least one uplink signal.

26. The apparatus of claim 25, wherein the at least one uplink signal comprises channel state information or a scheduling request.

27. A method of wireless communication performed by a user equipment (UE), comprising:
  obtaining one or more of a number of actual bits or a number of dummy bits associated with a hybrid automatic repeat request acknowledgement (HARQ-ACK) transmission that includes one or more of a deferred semi-persistent scheduling (SPS) HARQ-ACK or a retransmitted HARQ-ACK codebook; and
  transmitting the HARQ-ACK using a power for a physical uplink control channel (PUCCH) that is based at least in part on the number of actual bits, or a total number of bits that is a sum of the number of actual bits and the number of dummy bits.

28. An apparatus for wireless communication at a user equipment (UE), comprising:
one or more memories; and
one or more processors, coupled to the one or more memories, configured to:
receive an indication for the UE to retransmit a hybrid automatic repeat request acknowledgement (HARQ-ACK), wherein the HARQ-ACK corresponds to a HARQ-ACK transmission type of a set of HARQ-ACK transmission types, the set of HARQ-ACK transmission types comprising two or more of: a deferred SPS HARQ-ACK, a retransmitted HARQ-ACK codebook, or a standard HARQ-ACK; and
transmit a HARQ-ACK transmission including a concatenation of at least two HARQ-ACK transmission types of the set of HARQ-ACK transmission types.

29. The apparatus of claim 28, wherein the concatenation comprises the retransmitted HARQ-ACK codebook followed by the deferred SPS HARQ-ACK.

30. The apparatus of claim 28, wherein the concatenation of the deferred SPS HARQ-ACK and the retransmitted HARQ-ACK codebook is preceded by the standard HARQ-ACK.

31. The apparatus of claim 28, wherein the indication corresponds to one or more of: downlink control information (DCI), or radio resource control (RRC) signaling.

32. The apparatus of claim 28, wherein the HARQ-ACK transmission comprises a physical uplink control channel (PUCCH) transmission.

33. A method of wireless communication performed by a user equipment (UE), comprising:
receiving an indication for the UE to retransmit a hybrid automatic repeat request acknowledgement (HARQ-ACK), wherein the HARQ-ACK corresponds to a HARQ-ACK transmission type of a set of HARQ-ACK transmission types, the set of HARQ-ACK transmission types comprising two or more of: a deferred SPS HARQ-ACK, a retransmitted HARQ-ACK codebook, or a standard HARQ-ACK; and
transmitting a HARQ-ACK transmission including a concatenation of at least two HARQ-ACK transmission types of the set of HARQ-ACK transmission types.

34. The method of claim 33, wherein the concatenation comprises the retransmitted HARQ-ACK codebook followed by the deferred SPS HARQ-ACK.

35. The method of claim 33, wherein the concatenation of the deferred SPS HARQ-ACK and the retransmitted HARQ-ACK codebook is preceded by the standard HARQ-ACK.

* * * * *